US012610335B2

(12) United States Patent
Meng et al.

(10) Patent No.:  US 12,610,335 B2
(45) Date of Patent:  Apr. 21, 2026

(54) SYNCHRONIZATION OFFSET IDENTIFICATION AND REFINEMENT FOR NETWORK BASED POSITIONING IN UNLICENSED SPECTRUM

(71) Applicant: Nokia Solutions and Networks Oy, Espoo (FI)

(72) Inventors: Yan Meng, Shanghai (CN); Tao Tao, Shanghai (CN); Ryan Keating, Chicago, IL (US); Jianguo Liu, Shanghai (CN)

(73) Assignee: Nokia Solutions and Networks Oy, Espoo (FI)

(*) Notice: Subject to any disclaimer, the term of this patent is extended or adjusted under 35 U.S.C. 154(b) by 476 days.

(21) Appl. No.: 18/040,335

(22) PCT Filed: Aug. 14, 2020

(86) PCT No.: PCT/CN2020/109057
§ 371 (c)(1),
(2) Date: Feb. 2, 2023

(87) PCT Pub. No.: WO2022/032609
PCT Pub. Date: Feb. 17, 2022

(65) Prior Publication Data
US 2023/0269687 A1      Aug. 24, 2023

(51) Int. Cl.
*H04W 56/00*        (2009.01)
*H04W 16/14*        (2009.01)
*H04W 74/0808*      (2024.01)
(52) U.S. Cl.
CPC ....... *H04W 56/0065* (2013.01); *H04W 16/14* (2013.01); *H04W 74/0808* (2013.01)
(58) Field of Classification Search
CPC ............. H04W 56/0065; H04W 16/14; H04W 74/0808; H04W 56/006; H04W 56/001;
(Continued)

(56) References Cited

U.S. PATENT DOCUMENTS

| | | | |
|---|---|---|---|
| 10,212,608 B2 | 2/2019 | Chrabieh | |
| 2015/0099525 A1* | 4/2015 | Ji | H04W 72/1215 |
| | | | 455/450 |

(Continued)

FOREIGN PATENT DOCUMENTS

| | | |
|---|---|---|
| CN | 105744560 A | 7/2016 |
| CN | 106993334 A | 7/2017 |

(Continued)

OTHER PUBLICATIONS

Office Action received for corresponding Chinese Patent Application No. 202080103921.4, dated May 27, 2024, 10 pages of Office Action and no page of translation available.

(Continued)

*Primary Examiner* — Wesley L Kim
*Assistant Examiner* — Erkin Abdullaev
(74) *Attorney, Agent, or Firm* — Barta Jones, PLLC

(57)        ABSTRACT

Disclosed are devices for time synchronization offset identification and refinement for network based positioning in an unlicensed spectrum. An example network device may comprise at least one processor and at least one memory including computer program code. The at least one memory and the computer program code may be configured to, with the at least one processor, cause the network device to receive listen-before-talk (LBT) outcomes from a plurality of base stations (BSs), and identify whether one or more of the plurality of BSs have a time synchronization offset based on the LBT outcomes. The LBT may be related to a reference signal (RS) configured on the BSs. The related methods, apparatuses and computer program product are also disclosed.

3 Claims, 15 Drawing Sheets

(58) Field of Classification Search

CPC ... H04W 64/00; H04W 4/023; H04W 64/003; H04L 5/0048; H04L 27/0006; H04L 43/0864; H04L 47/283; G01S 5/021; G01S 5/14; G01S 13/74; G01S 5/0242; G01S 5/0289

See application file for complete search history.

(56) References Cited

U.S. PATENT DOCUMENTS

| | | | | |
|---|---|---|---|---|
| 2015/0148053 A1* | 5/2015 | Patel | .................. | H04W 56/001 |
| | | | | 455/561 |
| 2016/0105897 A1* | 4/2016 | Liu | ....................... | H04W 72/54 |
| | | | | 370/235 |
| 2016/0309511 A1 | 10/2016 | Li et al. | | |
| 2017/0085346 A1 | 3/2017 | Tiirola et al. | | |
| 2018/0220318 A1* | 8/2018 | Uemura | ............... | H04B 17/318 |
| 2018/0279211 A1 | 9/2018 | Lunttila et al. | | |
| 2018/0352577 A1* | 12/2018 | Zhang | ............... | H04W 74/0816 |
| 2019/0053276 A1 | 2/2019 | Karaki et al. | | |
| 2019/0141748 A1 | 5/2019 | Li et al. | | |
| 2019/0159249 A1 | 5/2019 | Ahn et al. | | |
| 2019/0191403 A1* | 6/2019 | Goel | .................... | H04L 27/2695 |
| 2019/0327784 A1* | 10/2019 | Tarimala | ............... | H04W 76/27 |
| 2019/0335504 A1* | 10/2019 | Chakraborty | ......... | H04W 16/14 |
| 2020/0028583 A1 | 1/2020 | Radulescu et al. | | |
| 2020/0229124 A1* | 7/2020 | Soriaga | ................. | H04W 4/023 |
| 2020/0396621 A1* | 12/2020 | Park | ..................... | H04B 17/336 |
| 2021/0112520 A1* | 4/2021 | Yerramalli | ............ | H04W 80/02 |

FOREIGN PATENT DOCUMENTS

| | | |
|---|---|---|
| CN | 107925547 A | 4/2018 |
| CN | 110225526 A | 9/2019 |
| CN | 111096030 A | 5/2020 |
| WO | 2015/180105 A1 | 12/2015 |
| WO | 2016/060890 A1 | 4/2016 |
| WO | 2016/072717 A1 | 5/2016 |
| WO | 2016/165656 A1 | 10/2016 |
| WO | 2017/196329 A1 | 11/2017 |
| WO | 2020/057259 A1 | 3/2020 |

OTHER PUBLICATIONS

"NR-based Access to Unlicensed Spectrum", 3GPP TSG RAN meeting #86, RP-193063, Agenda item: 9.4.3, Qualcomm, Dec. 9-12, 2019, pp. 1-57.

"TP for DL signals and channels for NR-U", 3GPP TSG RAN WG1 Meeting #100bis-e, R1-2002528, Agenda item: 3 7.2.2.1.2, Qualcomm Incorporated, Apr. 20-30, 2020, pp. 1-5.

"3rd Generation Partnership Project; Technical Specification Group Radio Access Network; NR; Requirements for support of radio resource management (Release 16)", 3GPP TS 38.133, V16.3.0, Mar. 2020, 1169 pages.

"New WID: NR Positioning Support"; 3GPP TSG RAN Meeting #83, RP-190752, Agenda Item: 9.1.1, Intel Corporation, Mar. 18-21, 2019, 6 pages.

"Introduction of NR positioning support", 3GPP TSG-RAN WG1 Meeting #99, R1-1913661, Ericsson, Nov. 18-22, 2019, 10 pages.

"New SID on NR Positioning Enhancements", 3GPP TSG RAN Meeting #86, RP-193237, Agenda Item: 9.1.1, Qualcomm Incorporated, Dec. 9-12, 2019, 4 pages.

"Chairman's notes of AI 6.1.1 Maintenance of E-UTRA Release 8-14", 3GPP TSG-RAN WG1 Meeting #97, R1-1907596, Agenda Item: 6.1.1. Ericsson, May 13-17, 2019, 1 page.

"Chairman's notes of AI 6.1.2 Maintenance of E-UTRA Release 15", 3GPP TSG-RAN WG1 Meeting #97, R1-1907597, Agenda Item: 6.1.2, Ericsson, May 13-17, 2019, 1 page.

"Chairman's notes of AI 6.2.1 Additional MTC Enhancements", 3GPP TSG-RAN WG1 Meeting #97, R1-1907598, Agenda Item: 6.2.1, May 13-17, 2019, 7 pages.

"Chairman's notes of AI 6.2.2 Additional Enhancements for NB-Iot", 3GPP TSG-RAN WG1 Meeting #97, R1-1907599 Agenda Item: 6.2.2, May 13-17, 2019, 5 pages.

"Chairman's notes of AI 6.2.3 DL MIMO efficiency enhancements for LTE", 3GPP TSG-RAN WG1 Meeting #97, R1-1907600, Agenda Item: 6.2.3, May 13-17, 2019, 2 pages.

"Chairman's notes of AI 6.2.4 LTE-based 5G Terrestrial Broadcast", 3GPP TSG-RAN WG1 Meeting #97, R1-1907601, Agenda Item: 6.2.4, Ericsson, May 13-17, 2019, 2 pages.

"Chairman's notes of AI 6.1 Maintenance of E-UTRA Releases 8-15", 3GPP TSG-RAN WG1 Meeting #99, R1-1913373, Agenda Item: 6.1, Ericsson, Nov. 18-22, 2019, 1 page.

"Chairman's notes of AI 6.2.1 Additional MTC Enhancements", 3GPP TSG-RAN WG1 Meeting #99, R1-19113374, Agenda Item: 6.2.1, Samsung, Nov. 18-22, 2019, 10 pages.

"Chairman's notes of AI 6.2.2 Additional Enhancements for NB-IoT", 3GPP TSG-RAN WG1 Meeting #99, R1-1913375, Agenda Item: 6.2.2, Samsung, Nov. 18-22, 2019, 5 pages.

"Chairman's notes of AI 6.2.3 DL MIMO efficiency enhancements for LTE", 3GPP TSG-RAN WG1 Meeting #99, R1-1913376, Agenda Item: 6.2.3, Samsung, Nov. 18-22, 2019, 2 pages.

"Chairman's notes of AI 6.2.4 LTE-based 5G Terrestrial Broadcast", 3GPP TSG-RAN WG1 Meeting #99, R1-1913377, Agenda Item: 6.2.4, Ericsson, Nov. 18-22, 2019, 5 pages.

"Chairman's notes of AI 6.2.5 LTE Rel-16 TEIs", 3GPP TSG-RAN WG1 Meeting #99, R1-1913378, Agenda Item: 6.2.5, Ericsson, Nov. 18-22, 2019, 2 pages.

"Chairman's notes of AI 7.1.2 Maintenance for MIMO", 3GPP TSG-RAN WG1 Meeting #99, R1-1913379, Agenda Item: 7.1.2, Samsung, Nov. 18-22, 2019, 1 page.

"Chairman's notes of AI 7.1.4 Maintenance of NR-LTE Co-existence", 3GPP TSG-RAN WG1 Meeting #99, R1-1913380, Agenda Item: 7.1.4, Ericsson, Nov. 18-22, 2019, 1 page.

"Chairman's notes of AI 7.1.5 Maintenance for UL power control", 3GPP TSG RAN WG1 Meeting #99, R1-1913381, Agenda Item: 7.1.5, Samsung. Nov. 18-22, 2019, 1 page.

"Chairman's notes of AI 7.1.6", 3GPP TSG RAN WG1 Meeting #99, R1-1913382, Agenda Item: 7.1.6, NTT DOCOMO, Inc, Nov. 18-22, 2019, 1 page.

"Chairman's notes of AI 7.2.2 NR-Based Access to Unlicensed Spectrum", 3GPP TSG-RAN WG1 Meeting #99, R1-1913383, Agenda Item: 7.2.2, Ericsson, Nov. 18-22, 2019, 21 pages.

"Chairman's notes of AI 7.2.5 Study on Solutions for NR to Support Non-Terrestrial Network (NTN)", 3GPP TSG-RAN WG1 Meeting #99, R1-1913384, Agenda Item: 7.2.5, Ericsson, Nov. 18-22, 2019, 5 pages.

"Chairman's notes of AI 7.2.8 Enhancements on MIMO for NR", 3GPP TSG RAN WG1 Meeting #99, R1-1913385, Agenda Item: 7.2.8, Samsung, Nov. 18-22, 2019, 12 pages.

"Chairman's notes of AI 7.2.10 NR Positioning Support", 3GPP TSG-RAN WG1 Meeting #99, R1-1913386, Agenda Item: 7.2.10, Ericsson, Nov. 18-22, 2019, 9 pages.

"Chairman's notes of AI 7.2.12 NR Mobility Enhancements", 3GPP TSG-RAN WG1 Meeting #99, R1-1913387, Agenda Item: 7.2.12, Ericsson, Nov. 18-22, 2019, 2 pages.

"Chairman's notes of AI 7.2.14 NR Rel-16 TEIs", 3GPP TSG-RAN WG1 Meeting #99, R1-1913388, Agenda Item: 7.2.14, Ericsson, Nov. 18-22, 2019, 2 pages.

"On indicating LBT failure for NR-U", 3GPP TSG-RAN WG2#105, R2-1901001, Agenda Item: 11.2.2.2, Samsung, Fe. 25-Mar. 1, 2019, 1 page.

International Search Report and Written Opinion received for corresponding Patent Cooperation Treaty Application No. PCT/CN2020/109057, dated May 12, 2021, 10 pages.

Extended European Search Report received for corresponding European Patent Application No. 20949107.5, dated Jul. 17, 2023, 14 pages.

* cited by examiner

100

810. receive LBT outcomes from a plurality of base stations 820. identify whether one or more of base stations have time synchronization offset 840. receive report from UE indicating quality of RS 830. trigger forward or backward timing adjustment for Identified one or more of base stations

900

910

920

930

940

1810. trigger transmission of RS at anchor network device 1820. monitor ToA of RS 1830. determine expected ToA of RS 1840. calculate time synchronization offset based on difference between expected ToA and monitored ToA 1850. adjust timing to compensate for calculated time synchronization offset

1900

1910

1920

1930

1940

1950

2000

2010. measure quality associated with RS transmitted from first network device 2020. report quality to second network device

SYNCHRONIZATION OFFSET IDENTIFICATION AND REFINEMENT FOR NETWORK BASED POSITIONING IN UNLICENSED SPECTRUM

RELATED APPLICATION

This application claims priority to PCT Application No. PCT/CN2020/109057, filed on Aug. 14, 2020, each of which is incorporated herein by reference in its entirety.

TECHNICAL FIELD

Various example embodiments described herein generally relate to methods and apparatuses for time synchronization offset identification and refinement for network based positioning in an unlicensed spectrum.

BACKGROUND

Certain abbreviations that may be found in the description and/or in the figures are herewith defined as follows:
BS Base Station
CCA Clear Channel Assessment
CN Core Network
DL Downlink
DL-AoD Downlink Angle of Departure
DL-TDOA Downlink Time Difference of Arrival
E-CID Enhanced Cell ID
eNB 4G Base Station
FDM Frequency Division Multiplexing
gNB 5G Base Station
LBT Listen Before Talking
LMF Location Management Function
LTE Long Term Evolution
Multi-RTT Multi-cell Round Trip Time
NR New Radio
NR-U New Radio in Unlicensed Spectrum
NRPPa NR Positioning Protocol A
OFDM Orthogonal Frequency Division Multiplexing
OTDOA Observed Time Difference of Arrival
PRS Positioning Reference Signal
RB Resource Block
RS Reference Signal
RSTD Reference Signal Time Difference
SINR Signal to Interference plus Noise Ration
ToA Time of Arrival
UE User Equipment
UL Uplink
UL-AoA Uplink Angle of Arrival
UL-TDOA Uplink Time Difference of Arrival
WiFi Wireless Fidelity Many positioning solutions have been proposed for position estimation of a UE in a communication network such as 5G NR, including for example DL-TDOA, UL-TDOA, E-CID DL-AOD, UL-AoA and Multi-RTT. The positioning services lead to higher time synchronization requirements for the network because a synchronization offset would directly influence the positioning accuracy, especially for TDOA based methods. It is also expected to extend the network based positioning to an unlicensed spectrum, which would greatly benefit industrial automation where high accuracy positioning is important.

SUMMARY

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for a more detailed description provided below.

In a first aspect, an example embodiment of a network device is provided. The network device may comprise at least one processor and at least one memory including computer program code. The at least one memory and the computer program code may be configured to, with the at least one processor, cause the network device to receive LBT outcomes from a plurality of BSs, and identify whether one or more of the plurality of BSs have a time synchronization offset based on the LBT outcomes. The LBT may be related to a RS configured on the BSs.

In a second aspect, an example embodiment of a network device is provided. The network device may comprise at least one processor and at least one memory including computer program code. The at least one memory and the computer program code may be configured to, with the at least one processor, cause the network device to perform an LBT procedure before transmitting a RS on unlicensed spectrum, and transmit an outcome of the LBT procedure to an LMF.

In a third aspect, an example embodiment of a network device is provided. The network device may comprise at least one processor and at least one memory including computer program code. The at least one memory and the computer program code may be configured to, with the at least one processor, cause the network device to perform at least two CCAs in an LBT procedure before transmitting a signal on unlicensed spectrum, and identify whether there is a time synchronization offset based on the last two CCA outcomes.

In a fourth aspect, an example embodiment of a network device is provided. The network device may comprise at least one processor and at least one memory including computer program code. The at least one memory and the computer program code may be configured to, with the at least one processor, cause the network device to perform at least two CCAs in an LBT procedure to obtain a first outcome from the second last CCA and a second outcome from the last CCA, before transmitting a signal on unlicensed spectrum, receive a timing adjustment indication from an anchor network device in a case where both the first CCA outcome and the second CCA outcome are positive, and adjust timing of the network device backward to synchronize with the anchor network device.

In a fifth aspect, an example embodiment of a network device is provided. The network device may comprise at least one processor and at least one memory including computer program code. The at least one memory and the computer program code may be configured to, with the at least one processor, cause the network device to perform an LBT procedure to obtain an LBT outcome before transmitting a signal on unlicensed spectrum, detect a RS from an additional network device when the LBT outcome is negative, and in a case where the RS is detected, adjust timing of the network device forward to synchronize with the additional network device when the network device is a normal network device and the additional network device is an anchor network device, or indicate a backward timing adjustment for the additional network device when the network device is an anchor network device and the additional network device is a normal network device.

In a sixth aspect, an example embodiment of a network device is provided. The network device may comprise at least one processor and at least one memory including computer program code. The at least one memory and the computer program code may be configured to, with the at least one processor, cause the network device to trigger transmission of a RS at an anchor network device, in response to identification of a time synchronization offset for the network device, monitor a ToA of the RS from the anchor network device, determine an expected ToA of the RS, calculate a difference between the expected ToA and the monitored ToA as the time synchronization offset between the network device and the anchor network device, and adjust timing of the network device to compensate for the calculated time synchronization offset.

In a seventh aspect, an example embodiment of a terminal device is provided. The terminal device may comprise at least one processor and at least one memory including computer program code. The at least one memory and the computer program code configured to, with the at least one processor, cause the terminal device at least to measure a quality associated with a RS transmitted from a first network device on unlicensed spectrum, and report the quality to a second network device. The quality may be indicative of a degree of interference in the unlicensed spectrum.

In an eighth aspect, an example embodiment of a method implemented at a network device is provided. The method may comprise receiving LBT outcomes from a plurality of BSs, and identifying whether one or more of the plurality of BSs have a time synchronization offset based on the LBT outcomes. The LBT may be related to a RS configured on the BSs.

In a ninth aspect, an example embodiment of a method implemented at a network device is provided. The method may comprise performing an LBT procedure before transmitting a RS on unlicensed spectrum, and transmitting an outcome of the LBT procedure to an LMF.

In a tenth aspect, an example embodiment of a method implemented at a network device is provided. The method may comprise performing at least two CCAs in an LBT procedure before transmitting a signal on unlicensed spectrum, and identifying whether there is a time synchronization offset based on the last two CCA outcomes.

In an eleventh aspect, an example embodiment of a method implemented at a network device is provided. The method may comprise performing at least two CCAs in an LBT procedure to obtain a first outcome from the second last CCA and a second outcome from the last CCA, before transmitting a signal on unlicensed spectrum, receiving a timing adjustment indication from an anchor network device in a case where both the first CCA outcome and the second CCA outcome are positive, and adjusting timing of the network device backward to synchronize with the anchor network device.

In a twelfth aspect, an example embodiment of a method implemented at a network device is provided. The method may comprise performing an LBT procedure to obtain an LBT outcome before transmitting a signal on unlicensed spectrum, detecting a RS from an additional network device when the LBT outcome is negative, and in a case where the RS is detected, adjusting timing of the network device forward to synchronize with the additional network device when the network device is a normal network device and the additional network device is an anchor network device, or indicating a backward timing adjustment for the additional network device when the network device is an anchor network device and the additional network device is a normal network device.

In a thirteenth aspect, an example embodiment of a method implemented at a network device is provided. The method may comprise triggering transmission of a RS at an anchor network device, in response to identification of a time synchronization offset for the network device, monitoring a ToA of the RS from the anchor network device, determining an expected ToA of the RS, calculating a difference between the expected ToA and the monitored ToA as the time synchronization offset between the network device and the anchor network device, and adjusting timing of the network device to compensate for the calculated time synchronization offset.

In a fourteenth aspect, an example embodiment of a method implemented at a terminal device is provided. The method may comprise measuring a quality associated with a RS transmitted from a first network device on unlicensed spectrum, and reporting the quality to a second network device. The quality may be indicative of a degree of interference in the unlicensed spectrum.

In a fifteenth aspect, an example embodiment of a computer program product is provided. The computer program product may be embodied in at least one computer readable medium and comprise instructions. The instructions may, when executed by at least one processor in a network device, cause the network device to receive LBT outcomes from a plurality of BSs and identify whether one or more of the plurality of BSs have a time synchronization offset based on the LBT outcomes. The LBT may be related to a RS configured on the BSs.

In a sixteenth aspect, an example embodiment of a computer program product is provided. The computer program product may be embodied in at least one computer readable medium and comprise instructions. The instructions may, when executed by at least one processor in a network device, cause the network device to perform an LBT procedure before transmitting a RS on an unlicensed spectrum and transmit an outcome of the LBT procedure to an LMF.

In a seventeenth aspect, an example embodiment of a computer program product is provided. The computer program product may be embodied in at least one computer readable medium and comprise instructions. The instructions may, when executed by at least one processor in a network device, cause the network device to perform at least two CCAs in an LBT procedure before transmitting a signal on unlicensed spectrum and identify whether there is a time synchronization offset based on the last two CCA outcomes.

In an eighteenth aspect, an example embodiment of a computer program product is provided. The computer program product may be embodied in at least one computer readable medium and comprise instructions. The instructions may, when executed by at least one processor in a network device, cause the network device to perform at least two CCAs in an LBT procedure to obtain a first outcome from the second last CCA and a second outcome from the last CCA before transmitting a signal on unlicensed spectrum, receive a timing adjustment indication from an anchor network device in a case where both the first CCA outcome and the second CCA outcome are positive, and adjust timing of the network device backward to synchronize with the anchor network device.

In a nineteenth aspect, an example embodiment of a computer program product is provided. The computer program product may be embodied in at least one computer readable medium and comprise instructions. The instructions may, when executed by at least one processor in a network device, cause the network device to perform an LBT procedure to obtain an LBT outcome before transmitting a signal on unlicensed spectrum, detect a RS from an additional network device when the LBT outcome is negative, and in a case where the RS is detected, adjust timing of the network device forward to synchronize with the additional network device when the network device is a normal network device and the additional network device is an anchor network device, or indicate a backward timing adjustment for the additional network device when the network device is an anchor network device and the additional network device is a normal network device.

In a twentieth aspect, an example embodiment of a computer program product is provided. The computer program product may be embodied in at least one computer readable medium and comprise instructions. The instructions may, when executed by at least one processor in a network device, cause the network device to trigger transmission of a RS at an anchor network device, in response to identification of a time synchronization offset for the network device, monitor a ToA of the RS from the anchor network device, determine an expected ToA of the RS, calculate a difference between the expected ToA and the monitored ToA as the time synchronization offset between the network device and the anchor network device, and adjust timing of the network device to compensate for the calculated time synchronization offset.

In a twenty first aspect, an example embodiment of a computer program product is provided. The computer program product may be embodied in at least one computer readable medium and comprise instructions. The instructions may, when executed by at least one processor in a terminal device, cause the terminal device to measure a quality associated with a RS transmitted from a first network device on unlicensed spectrum, and report the quality to a second network device. The quality may be indicative of a degree of interference in the unlicensed spectrum.

Other features and advantages of the example embodiments of the present disclosure will also be apparent from the following description of specific embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

Throughout the drawings, same or similar reference numbers indicate same or similar elements. A repetitive description on the same elements would be omitted.

DETAILED DESCRIPTION

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

Figure 1:
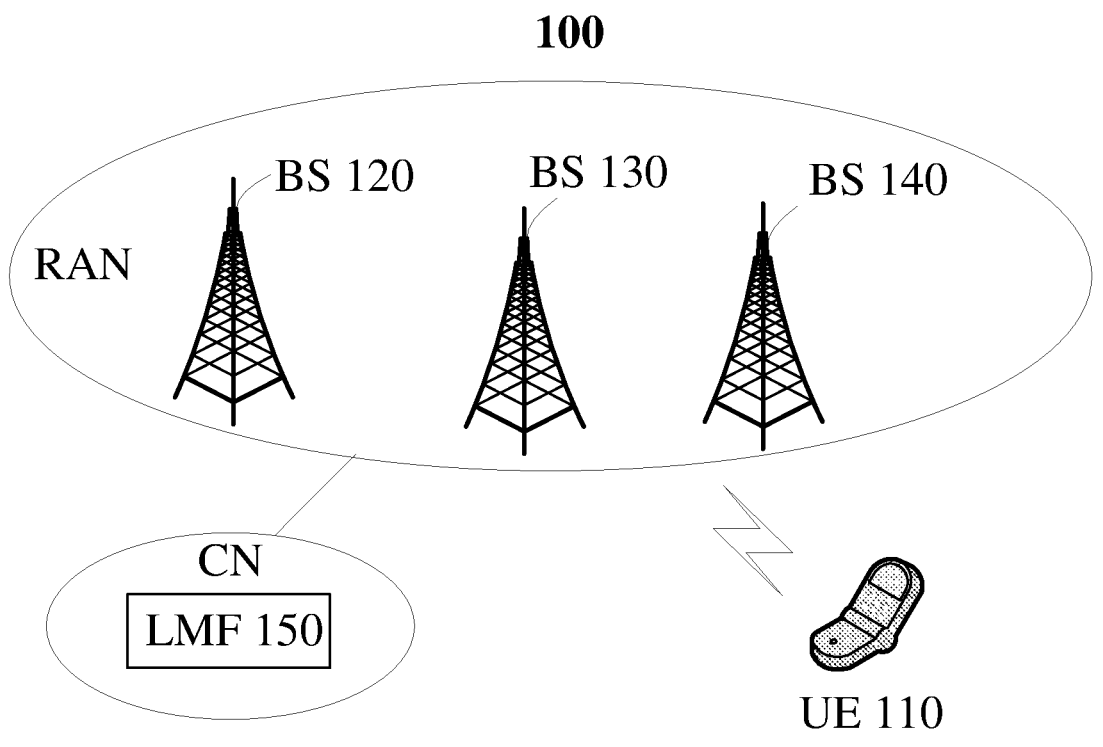
FIG. 1 illustrates a schematic diagram of an example communication network in which the present disclosure may be implemented.

FIG. 1 illustrates a schematic diagram of an example communication network 100 in which the present disclosure may be implemented. Referring to FIG. 1, a UE 110 may receive a reference signal (RS) such as a positioning reference signal (PRS) from a plurality of base stations (BSs) such as BS 120, BS 130 and BS 140 of a radio access network (RAN). It would be appreciated that the RS may also be any other reference signal that can be used for positioning, but not limited to the PRS. The measured time difference of arrival (TDOA) of the PRS from two BSs is known as Reference Signal Time Difference (RSTD). Using the RSTD measurements, transmission timing of the BSs and positions of the BSs (or physical antennae of the BSs), position of the UE 110 position may be calculated. The calculated position of the UE 110 may be stored in a location management function (LMF) 150 of the core network (CN). In some embodiments, the LMF 150 may be implemented inside the RAN as a local location management component (LMC), and functions and operations of the LMF 150 described below may be performed by the LMC.

Figure 2:
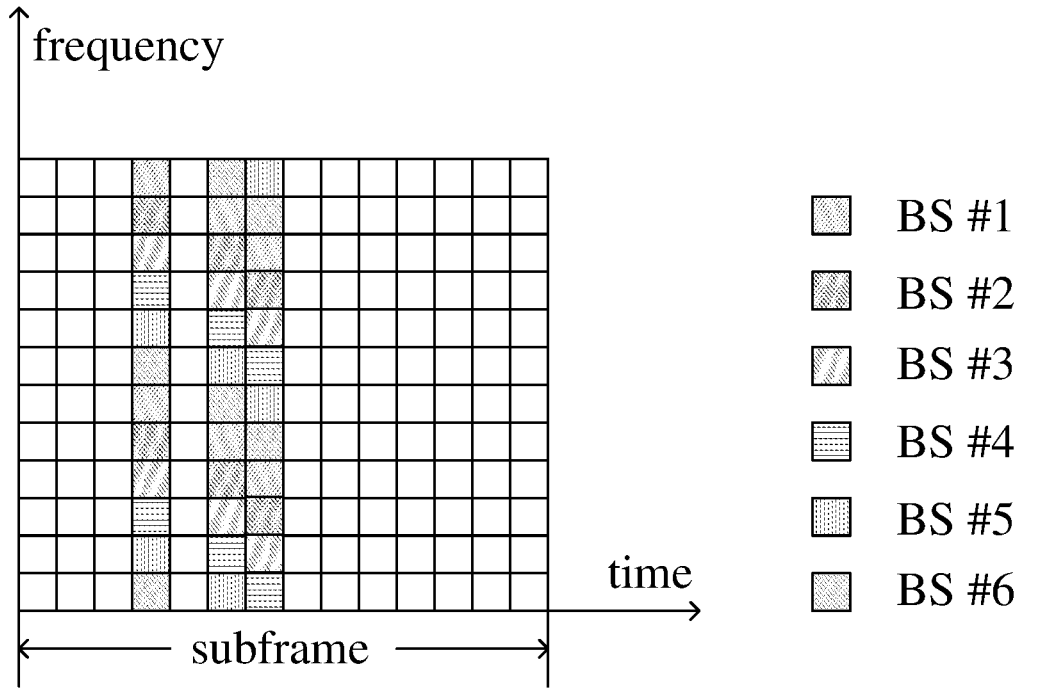
FIG. 2 illustrates an example pattern of network resource mapping for a positioning reference signal (PRS).

The PRS may be transmitted in downlink sub-frames configured for PRS transmission. In such a sub-frame, multiple BSs may transmit PRSs simultaneously using FDM. FIG. 2 illustrates an example pattern of network resource mapping for PRSs in a resource block (RB). The PRS is mapped to resource elements (REs) in the RB in a comb structure with shifts in frequency and time, and the frequency shift is determined by a comb-N value which is configurable from a predefined set of values such as {2, 4, 6, 12}. For example, FIG. 2 shows a comb-6 configuration where six BSs can simultaneously transmit PRSs using a different frequency shift in one sub-frame, and each BS can use two sub-carriers.

Positioning is also expected in 5G NR-U (NR in unlicensed spectrum), which may benefit industrial automation for example in countries where licensed or dedicated spectrum is not available for industrial use. In addition, high accuracy positioning has become a bottleneck for NR-U adoption in scenarios with no licensed spectrum available. Therefore, using unlicensed spectrum in positioning may also benefit industrial uses even with dedicated spectrum since a wider bandwidth may be used for high accuracy positioning.

In an unlicensed band, before transmitting any signal or data (e.g., the PRS), a BS has to perform a Listen-Before-Talk (LBT) procedure first to check if a transmission channel is available. For example, the BS may perform Clear Channel Assessment (CCA) by energy detection. If the detected energy is lower than a threshold, the unlicensed band is available and the CCA outcome is positive. Then the BS may transmit a signal or data using the unlicensed band. If the detected energy is higher than the threshold, the unlicensed band is busy, for example it is being used by WiFi and/or other types of communications. The CCA outcome is negative (LBT failure), and the BS cannot use the unlicensed band to transmit any signal or data.

Figure 3:
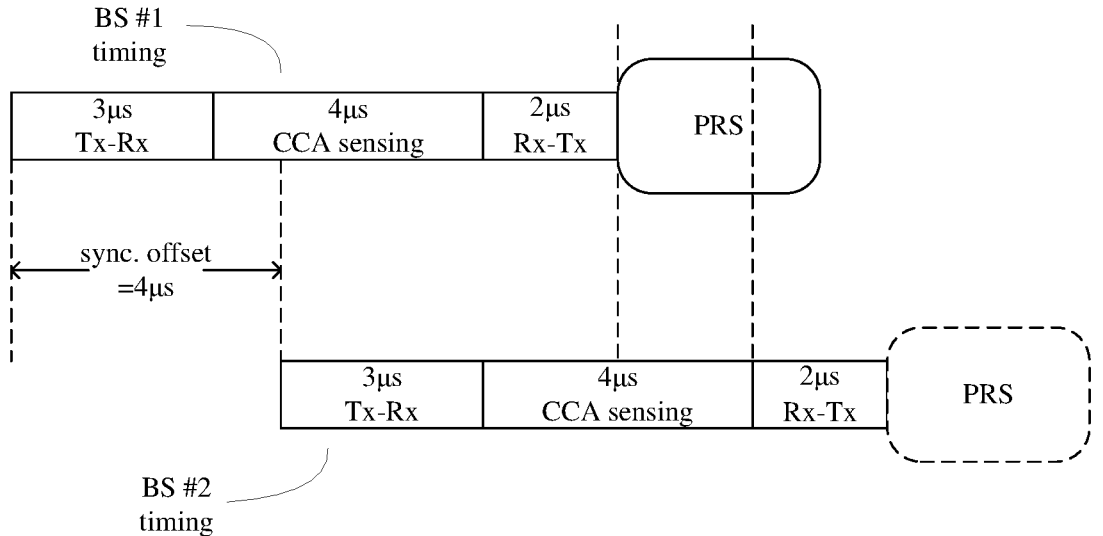
FIG. 3 illustrates a timing diagram of PRS transmissions showing LBT blocking due to a time synchronization offset between the network devices.

For NR-U positioning, the UE needs to receive multiple PRSs at the same time, which means that multiple BSs need to pass the LBT roughly around the same time window. However, LBT blocking may happen due to a time synchronization offset between the BSs. FIG. 3 illustrates a timing diagram of PRS transmissions showing the LBT blocking due to the time synchronization offset between the BSs. As shown in FIG. 3, it is assumed that the timing of BS #2 is behind that of BS #1 by a time synchronization offset of 4 μs, which may include for example a propagation delay of for example 1 μs and a synchronization error of for example 3 μs. In the NR-U system, a typical CCA period may be around 9 μs, including for example 3 μs for Tx-Rx switching. 4 μs for CCA sensing and 2 μs for Rx-Tx switching. In the example shown in FIG. 3, BS #1 passes the LBT because no other signal is sensed during the CCA sensing and transmits a PRS successfully. During the CCA sensing of BS #2, however, BS #2 senses the PRS from BS #1 for at least the last 2 μs. Then, BS #2 considers the unlicensed spectrum is busy and it would not transmit the PRS, even with no interference (e.g., due to WiFi and/or other signals). In such a case, the PRS transmission of BS #2 is blocked by BS #1 due to the large time synchronization offset between them.

If LBT blocking happens to one or more BSs during positioning of a UE, accuracy of the positioning may deteriorate, and in some cases, the positioning may not be properly carried out. For some positioning methods such as AoA and multi-RTT which have no constraint for the synchronization offset, the synchronization offset among multiple BSs may be so large (e.g., much larger than 3 μs) that LBT blocking becomes more serious when these positioning methods are used in the unlicensed spectrum.

Example embodiments for identifying and refining the time synchronization offset will be discussed below with reference to the accompanying drawings. With the embodiments, the time synchronization offset between the BSs may be reduced or eliminated, and thereby the positioning solutions can be used in the unlicensed spectrum to achieve a high accuracy.

Figure 4:
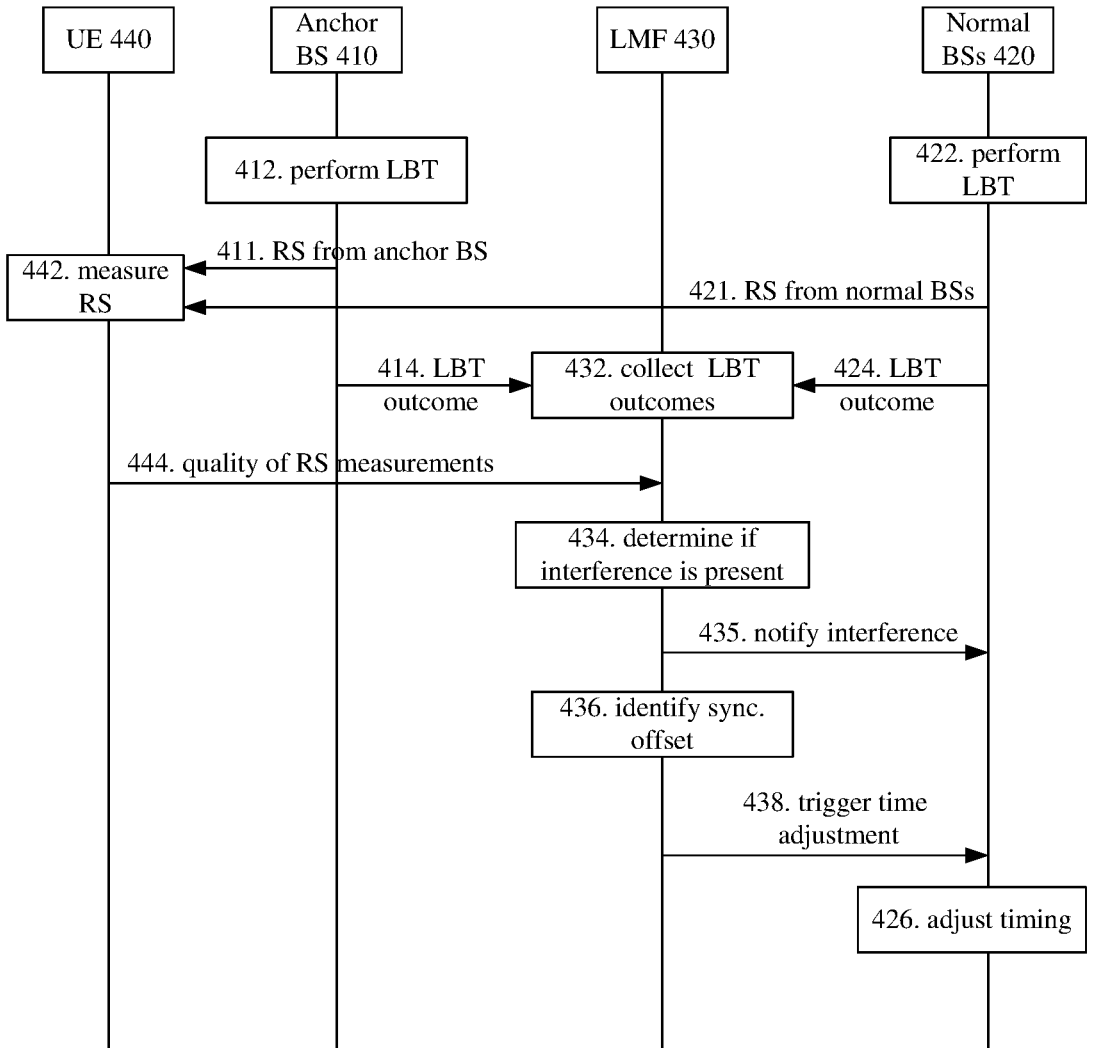
FIG. 4 illustrates an interaction diagram of example operations for identification of a time synchronization offset in accordance with some example embodiments.

FIG. 4 illustrates an interaction diagram of example operations for identification of a time synchronization offset in accordance with some example embodiments. As shown in FIG. 4, one BS for positioning of a UE 440 may be considered as a time synchronization source, which is shown as an anchor BS (also referred to as reference BS) 410 in FIG. 4, and one or more other BSs for positioning of the UE 440 in cooperation with the anchor BS 410 may be considered as normal BSs to be synchronized with the anchor BS 410, which are shown as normal BSs 420 in FIG. 4. In some embodiments, the anchor BS 410 may be the serving BS of the UE 440 or the master serving BS of the UE 440 when the UE 440 operates in a dual-connectivity mode. In addition, a network function such as an LMF 430 in the core network also participates in positioning of the UE 440. In some embodiments, instead of the LMF 430, a local location management component (LMC) implemented inside the RAN may be included for positioning of the UE 440. Assuming a well-controlled scenario with no interference like WiFi, the BSs 410, 420 operate with an unlicensed band. As discussed above, the BSs 410, 420 perform LBT to check channel availability before transmitting signals.

Referring to FIG. 4, when the anchor BS 410 and the normal BSs 420 are scheduled to transmit for example a RS such as a PRS, the anchor BS 410 may perform LBT in Operation 412 and the normal BSs 420 may perform LBT in Operation 422. The PRSs are scheduled to be transmitted at the same time for the BSs 410, 420, but due to a large synchronization offset, some of the BSs, either the anchor BS 410 or the normal BSs 420, may fail the LBT procedure, as shown in FIG. 3. In Operation 432, the LMF or LMC 430 may collect LBT outcome 414 from the anchor BS 410 and LBT outcome 424 from the normal BSs 420. In some embodiments, the LBT outcome may comprise one bit to indicate if the BS passes the LBT procedure or not. For example, if a CCA operation finds that an energy level in an unlicensed band is lower than a threshold, it may be determined that the band is available. In such a case, the BS passes the LBT procedure and the outcome bit may have a value "1". If the CCA operation finds that the energy level in the band exceeds the threshold, it may be determined that the band is occupied. In such a case, the BS fails the LBT procedure and the outcome bit may have a value "0". In Operation 436, the LMF 430 may identify whether one or more of the BSs 410, 420 have a time synchronization offset based on the LBT outcomes received from the BSs 410, 420. In particular, if the LBT outcome from one of the normal BSs 420 is different from the LBT outcome from the anchor BS 410, it can be determined that the one of the normal BSs

420 has a time synchronization offset relative to the anchor BS 410. For example, if the normal BS 420 has a negative LBT outcome while the anchor BS 410 has a positive LBT outcome, it can be determined that the normal BS 420 has timing behind the anchor BS 410 and thus experienced LBT blocking because of PRS transmission of the anchor BS 410. In such a case, timing of the normal BS 420 shall be adjusted forward so as to be synchronized with the anchor BS 410. If the normal BS 420 has a positive LBT outcome while the anchor BS 410 has a negative LBT outcome, it can be determined that the normal BS 420 has timing ahead of the anchor BS 410 and thus the anchor BS 410 experienced LBT blocking because of PRS transmission of the normal BS 420. In such a case, timing of the normal BS 420 shall be adjusted backward so as to be synchronized with the anchor BS 410. If both the anchor BS 410 and the normal BS 420 have a positive LBT outcome, it can be determined that the normal BS 420 is substantially synchronized to the anchor BS 410 and timing adjustment is not needed for the normal BS 420.

If one or more normal BSs 420 are identified as having the time synchronization offset relative to the anchor BS 410 in Operation 436, then in Operation 438, the LMF 430 may trigger a forward or backward timing adjustment for the one or more identified normal BSs 420. Responsive to the forward or backward timing adjustment trigger, the normal BSs 420 may adjust its timing in Operation 426, which will be detailed below.

In some embodiments, the UE 440 may check whether interference such as a WiFi signal exists in the unlicensed spectrum. For example, in Operation 422, the UE 440 may measure a reference signal (RS) 411 such as the PRS transmitted from the anchor BS 410 in the unlicensed spectrum and a RS 421 such as the PRS transmitted from the normal BSs 420 in the unlicensed spectrum. The UE 440 may report the measured quality such as SINR (signal to interference plus noise ratio) of the PRS to the LMF or LMC 430 in Operation 444. The quality of the PRS such as the SINR indicates a degree of interference in the unlicensed spectrum. If the SINR is low (e.g., if the SINR is lower than a predefined threshold and/or the like), it indicates that interference such as a WiFi signal may exist in the scenario, and thus the BSs 410, 420 may fail the LBT procedure due to the interference but not a time synchronization offset. If the SINR is high (e.g., if the SINR is greater than or otherwise satisfying a predefined threshold), it indicates that no other interference such as the WiFi signal exists in the scenario, and the LBT failure occurs due to the time synchronization offset. If the UE 400 detects no PRS, it also considers the SINR low and reports the quality measurement to the LMF or LMC 430.

In Operation 434, the LMF or LMC 430 may compare the measured quality received from the UE 440 with a predefined threshold to determine if interference exists. If the quality such as the SINR is higher than or equal to the predefined threshold, the LMF or LMC 430 determines in Operation 434 that there is no interference. If the quality such as the SINR is lower than the predefined threshold, the LMF or LMC 430 determines in Operation 434 that there is interference and notifies the interference to the normal BSs 420 in Operation 435. In case of receiving the interference notification from the LMF or LMC 430, the normal BSs 420 may ignore the timing adjustment trigger received from the LMF or LMC 430 at least for the current RS occasion.

It would be appreciated that in some embodiments, if interference is identified in Operation 434, the LMF 430 may not identify the time synchronization offset based on the LBT outcomes from the BSs 410, 420 because the LBT outcomes may be influenced by the interference. In some embodiments where the communication system is deployed in a well-controlled scenario with no interference like WiFi, the operations for the interference measurement, including Operations 442, 444, 434 and 435 may be omitted.

Figure 5:
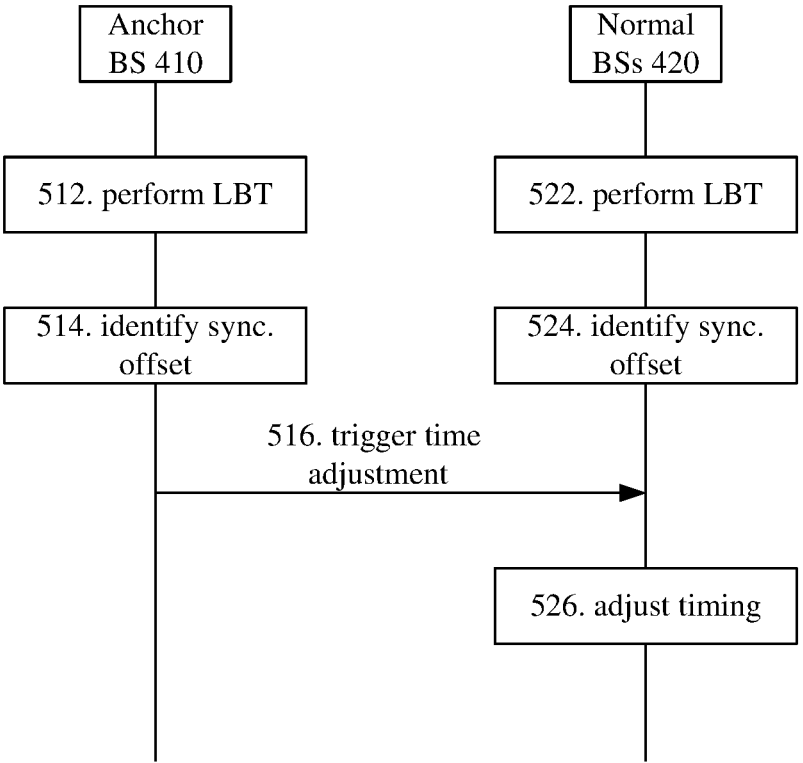
FIG. 5 illustrates an interaction diagram of example operations for identification of a time synchronization offset in accordance with some example embodiments.

FIG. 5 illustrates an interaction diagram of example operations for identification of a time synchronization offset in accordance with some example embodiments. In the embodiments shown in FIG. 5, the BSs may identify a time synchronization offset based on the LBT outcomes autonomously without assistance of the LMF.

Referring to FIG. 5, the anchor BS 410 performs LBT in Operation 512 and the normal BSs 420 perform LBT in Operation 522 before transmitting reference signals (RSs) such as positioning reference signals (PRSs). Similar to the procedure shown in FIG. 4, in the procedure illustrated in FIG. 5, the PRSs and the LBT procedure are scheduled at the same time. However, LBT failure may occur at one or more of the BSs 410, 420 due to a time synchronization offset between them.

The LBT procedure performed in Operation 512 may be the same as the LBT procedure performed in Operation 522, and it may include at least two CCAs operations. Then, the anchor BS 410 and the respective normal BS 420 may identify whether it has a time synchronization offset based on outcomes of the last two CCAs in Operations 514, 524. For example, if a first one of the last two CCA outcomes is positive while a second one of the last two CCA outcomes is negative, it can be determined that the BS has a time synchronization offset. If the normal BS 420 identifies a time synchronization offset in Operation 524, the normal BS 420 may adjust its own timing to synchronize with the anchor BS 410 in Operation 526. If the anchor BS 410 identifies a time synchronization offset in Operation 514, it can be determined that the anchor BS 410 is LBT-blocked by at least one normal BS 420 with timing ahead of the anchor BS 410, and the at least one normal BS 420 has positive outcomes for both the last two CCAs. Then, the anchor BS 410 may trigger the at least one normal BS 420 having positive outcomes for the last two CCAs to adjust timing backward in Operation 516. Once the normal BSs 420 receive the timing adjustment trigger from the anchor BS 410, they perform timing adjustment accordingly to synchronize with the anchor BS 410 in Operation 526, even if they have positive outcomes for the last two CCAs.

Figure 6:
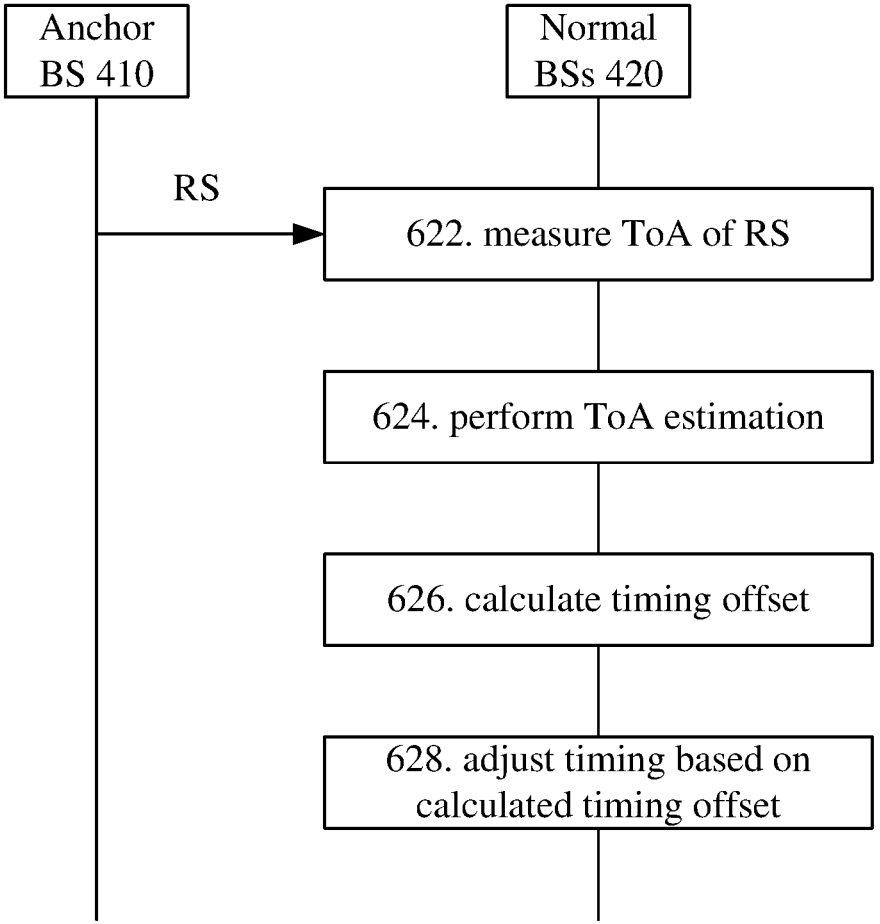
FIG. 6 illustrates an interaction diagram of example operations for refinement of a time synchronization offset in accordance with some example embodiments.

FIG. 6 illustrates an interaction diagram of example operations for time synchronization refinement in accordance with some example embodiments. Referring to FIG. 6, in Operation 622, the normal BS 420 may measure time of arrival (ToA) of a reference signal (RS) such as a positioning reference signal (PRS) received from the anchor BS 410. The anchor BS 410 may be configured to transmit the PRS periodically or responsive to instructions from the LMF 430. In some embodiments, the normal BS 420 may request the anchor BS 410 to transmit the PRS when the normal BS 420 receives the timing adjustment trigger from the LMF 430 or the anchor BS 410. The normal BS 420 may monitor the PRS from the anchor BS 410 when it receives the timing adjustment trigger from the anchor BS 410 or the LMF 430, or on its own initiative when it identifies the time synchronization offset as discussed above. In Operation 624, the normal BS 420 may estimate an expected ToA of the RS. The expected ToA may be calculated locally at the normal BSs 420 or obtained from assistance information from for example the anchor BS 410 or the LMF 430. In particular, the expected ToA may be calculated as a sum of the scheduled transmission timing of the PRS and an expected propagation delay of the PRS. In Operation 626, the normal BS 420 may calculate the time synchronization offset as a difference between the expected ToA and the measured ToA of the PRS. In some embodiments, the difference may be calculated as the expected ToA minus the measured ToA of the PRS. If the difference has a positive sign, it indicates that the timing of the normal BS 420 is ahead of the anchor BS 410 and will be adjusted backward; if the difference has a negative sign, it indicates that the timing of the normal BS 420 is behind the anchor BS 410 and should be adjusted forward. In some embodiments, a direction (e.g., forward or backward) of the timing adjustment may be determined at the normal BS 420 for example in Operation 524 or indicated by the LMF/LMC 430 for example in Operation 438 or the anchor BS 410 for example in Operation 516, and the sign of the difference may not be considered. In Operation 628, the normal BS 420 may adjust its timing based on the calculated time synchronization offset. In some embodiments, the calculated time synchronization offset may be compared to a threshold or maximum allowed offset value. If the calculated time synchronization offset is larger than the threshold or maximum allowed offset value, the timing adjustment in Operation 628 may be performed. If the calculated time synchronization offset is smaller than or equal to the threshold or maximum allowed offset value, the timing adjustment in Operation 628 may be omitted. It would be appreciated that the threshold or maximum allowed offset value may be fixed or variable.

Figure 7:
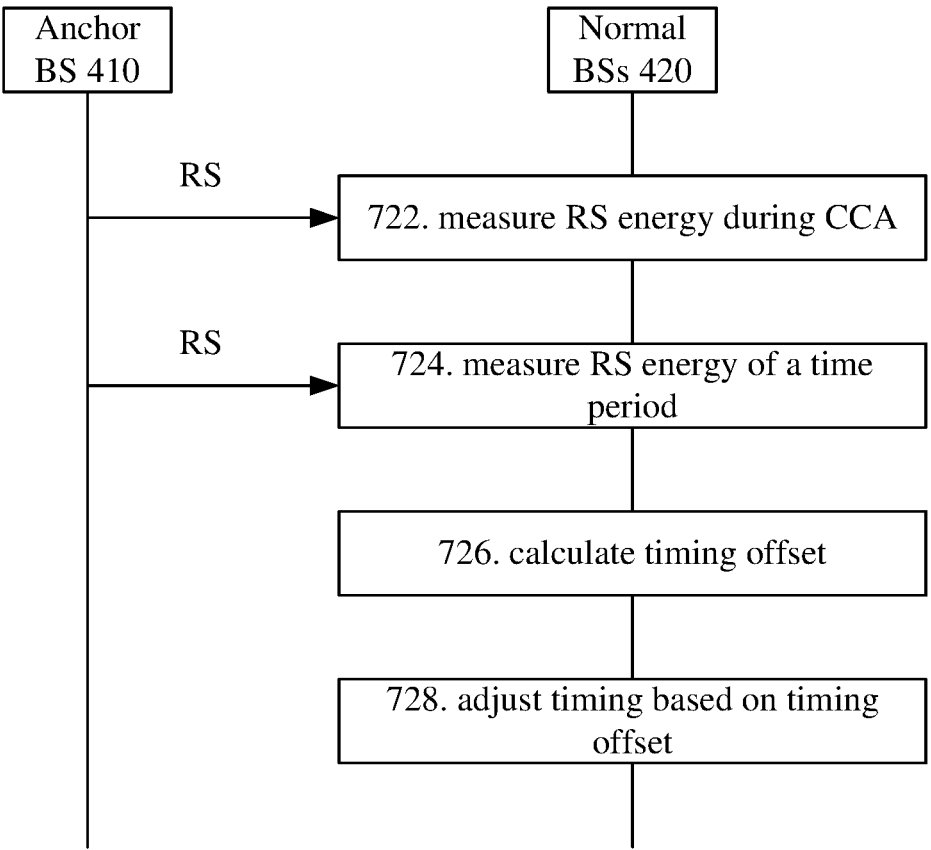
FIG. 7 illustrates an interaction diagram of example operations for refinement of a time synchronization offset in accordance with some example embodiments.

FIG. 7 illustrates an interaction diagram of example operations for time synchronization refinement in accordance with some other example embodiments. Referring to FIG. 7, in Operation 722, the normal BS 420 may measure energy P1 received during a CCA in a LBT procedure. The energy P1 may be received from a reference signal (RS) such as a positioning reference signal (PRS) from the anchor BS 410. In Operation 724, the normal BS 420 may measure energy P2 of the PRS from the anchor BS 410 during a transmission time period T2 of the PRS. As discussed above, the anchor BS 410 is configured to transmit the PRS periodically or responsive to instructions from the LMF 430 or the normal BS 420. In Operation 726, the normal BS 420 may calculate the time synchronization offset of the normal BS 420 relative to the anchor BS 410 as (P1/P2)*T2. For example, if the energy P1 is 25% of energy P2 during the time period T2 which is for example 4 µs, the calculated time synchronization offset would be 1 µs; and if the energy P1 is half of energy P2 during the time period T2 which is 4 µs, the calculated time synchronization offset would be 2 µs. In some embodiments, the time synchronization offset of the normal BS 420 relative to the anchor BS 410 may also be calculated as T0+(P1/P2)*T2 where T0 refers to a Rx-Tx switching time period between the CCA and the PRS transmission, as shown in FIG. 3. In Operation 728, the normal BS 420 may adjust its timing based on the calculated time synchronization offset. In some embodiments, the calculated time synchronization offset may be compared to a threshold or maximum allowed offset value. If the calculated time synchronization offset is larger than the threshold or maximum allowed offset value, the timing adjustment in Operation 728 may be performed. If the calculated time synchronization offset is smaller than or equal to the threshold or maximum allowed offset value, the timing adjustment in Operation 728 may be omitted.

It would be appreciated that the procedure shown in FIG. 7 is applicable when the timing of the normal BS 420 is behind the anchor BS 410 so that the normal BS 420 can sense the energy P1 from the anchor BS 410 during the LBT CCA. In addition, it would also be appreciated that the procedure of FIG. 7 may be carried out for two BSs so that the normal BS 420 senses the energy P1 from only the other BS during the LBT CCA. In a case where three or more BSs cooperates to position the UE, the timing adjustment procedure shown in FIG. 7 may be carried out for every two BSs including the anchor BS 410 and one normal BS 420 that is identified as having the time synchronization offset.

It would also be appreciated that the time synchronization refinement are not limited to the embodiments discussed above with reference to FIGS. 6-7. For example, in some embodiments, the normal BS 420 may adjust its timing by a predefined increment of time and repeat the adjustment until the time synchronization offset is reduced enough not to cause LBT blocking of the RS transmission in the unlicensed spectrum.

Figure 8:
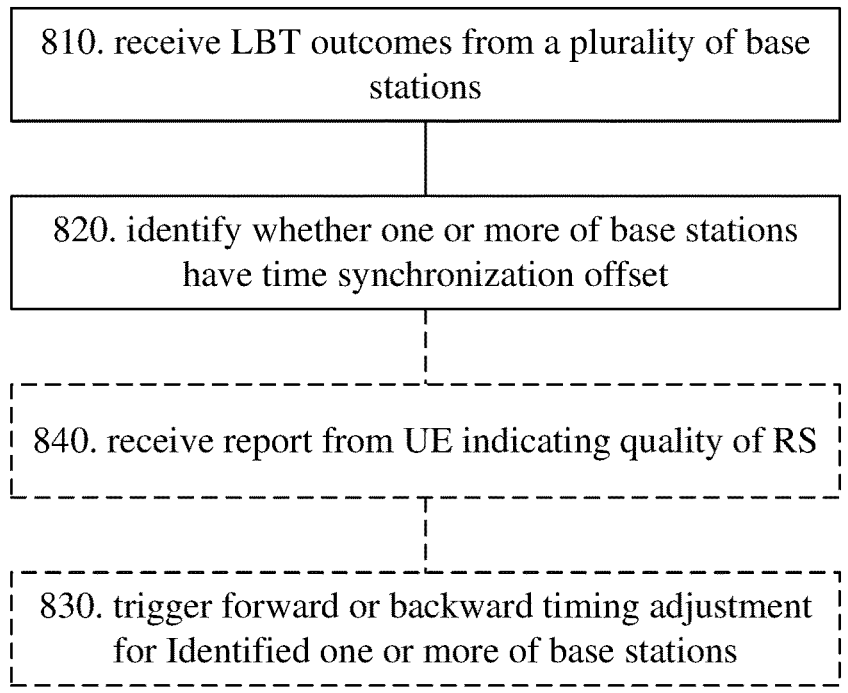
FIG. 8 illustrates a flow chart of an example method for identification of a time synchronization offset in accordance with some example embodiments.

FIG. 8 illustrates a flow chart of an example method 800 for identification of a time synchronization offset in accordance with some example embodiments. For a better understanding, the below description of the method 800 may be read also with reference to FIGS. 3-7. The method 800 may be performed for example at a network device such as the LMF or LMC 430.

As shown in FIG. 8, the example method 800 may include a step 810 of receiving LBT outcomes from a plurality of BSs and a step 820 of identifying whether one or more of the plurality of BSs have a time synchronization offset based on the LBT outcomes. The LBT may be performed at the plurality of BSs for transmission of a reference signal (RS) such as a positioning reference signal (PRS) in an unlicensed spectrum.

In NR-U, a plurality of BSs may perform a LBT procedure before transmitting the PRS in the unlicensed spectrum for positioning of a UE, and report the LBT outcome via for example an NRPPa signaling to the LMF 430. For example, one bit signaling b0 may be introduced to indicate the LBT result: successful LBT may be represented by b0=1 and failed LBT may be represented by b0=0.

In some embodiments, the plurality of BSs may be deployed in a well-controlled environment with no interference such as a WiFi signal, for example an indoor scenario. The plurality of BSs may include for example an anchor BS 410 and one or more normal BSs 420. The anchor BS 410 may be a serving BS or a master serving BS for the UE. In the step 820, the LMF 430 may identify whether one or more of the plurality of BSs have a time synchronization offset based on the LBT outcomes from the plurality of BSs. For example, if the LBT outcome of the normal BS 420 is different from the LBT outcome of the anchor BS 410, the LMF 430 may identify that the normal BS 420 has a time synchronization offset relative to the anchor BS 410.

In some embodiments, the normal BS 420 may have a negative LBT outcome, and the anchor BS 410 may have a positive LBT outcome. As the anchor BS 410 passes the LBT, it transmits the PRS. When the normal BS 420 has a time synchronization offset relative to the anchor BS 410, it may sense the PRS from the anchor BS 410 during the LBT procedure so that it gets a negative LBT outcome and fails the LBT. Therefore the normal BS 420 would not transmit the PRS. In this case, the LMF 430 may determine from the negative LBT outcome from the normal BS 420 and the positive LBT outcome from the anchor BS 410 that the timing of the normal BS 420 is behind the anchor BS 410.

Alternatively in some embodiments, the LMF 430 may determine that timing of the normal BS 420 is ahead of the anchor BS 410 when the normal BS 420 has a positive LBT outcome while the anchor BS 410 has a negative LBT outcome. In this situation, the LBT blocking at the anchor BS 410 may be caused by the PRS transmission at the normal BS 420 which passed the LBT procedure.

If both the normal BS 420 and the anchor BS 410 have a positive LBT outcome, the LMF 430 may determine that timing of the normal BS 420 is substantially synchronized to the anchor BS 410. In this situation, both the normal BS 420 and the anchor BS 410 pass the LBT within substantially the same window and no LBT-blocking occurs.

In some embodiments, the method 800 may further include a step 830 of triggering a forward or backward timing adjustment for one or more of the plurality of BSs identified with the time synchronization offset. If the normal BS 420 is identified with timing behind the anchor BS 410 at the step 830, the LMF 430 may trigger a forward timing adjustment for the normal BS 420; if the normal BS 420 is identified with timing ahead of the anchor BS 410 at the step 830, the LMF 430 may trigger a backward timing adjustment for the normal BS 420. In some embodiments, the LMF 430 may only indicate timing adjustment to the normal BS 420, and the normal BS 420 may determine how to adjust its own timing, as discussed above with reference to FIGS. 6-7. The LMF 430 may send the timing adjustment trigger to the normal BS 420 via NRPPa signaling.

In some embodiments, the method 800 may optionally include a step 840 of receiving a report from the UE 440 indicating quality of the RS such as the PRS from the plurality of BSs. The timing adjustment may be triggered when the quality of the RS is above a predefined threshold.

The UE 440 may be configured to measure quality of the PRS from the plurality of BSs and report the measured quality to the LMF 430. The quality may be for example SINR of the PRS received at the UE 440. If there is an interference such as a WiFi signal present during the PRS transmission, the measured quality may be poor and below a predefined threshold. And if there is no interference such as WiFi present during the RS transmission, the measured quality of the PRS would be good and above the predefined threshold. When receiving the quality measurement report from the UE 440, the LMF 430 may determine the interference level based on the quality measurement. If the interference is low (e.g., the measured quality is above the predefined threshold), the method 800 may proceed to the step 830 of triggering the timing adjustment for the normal BS. If the interference is high (e.g., the measured quality of the PRS is below the predefined threshold), the LBT blocking may be caused by the interference but not the time synchronization offset, and the LMF 430 may not perform the step 830. Instead, the LMF 430 may notify the interference to the normal BSs 420 which are identified as having the time synchronization offset based on the LBT outcomes and thus the normal BSs 420 may ignore the timing adjustment trigger at least for the current PRS occasion.

Figure 9:
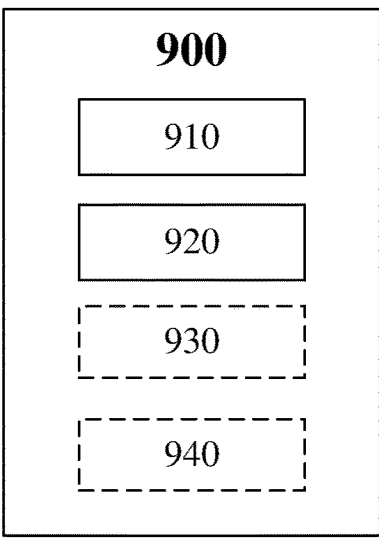
FIG. 9 illustrates a block diagram of an example apparatus in accordance with some example embodiments.

FIG. 9 illustrates a block diagram of an apparatus 900 in accordance with some example embodiments. The apparatus 900 may be implemented in for example the LMF 430 to perform the method 800 shown in FIG. 8. Referring to FIG. 9, the apparatus 900 may include a first means (or module) 910 for performing the step 810, and a second means 920 for performing the step 820. Optionally, the apparatus 900 may further include a third means 930 for performing the step 830, and a fourth means 940 for performing the step 840.

Figure 10:
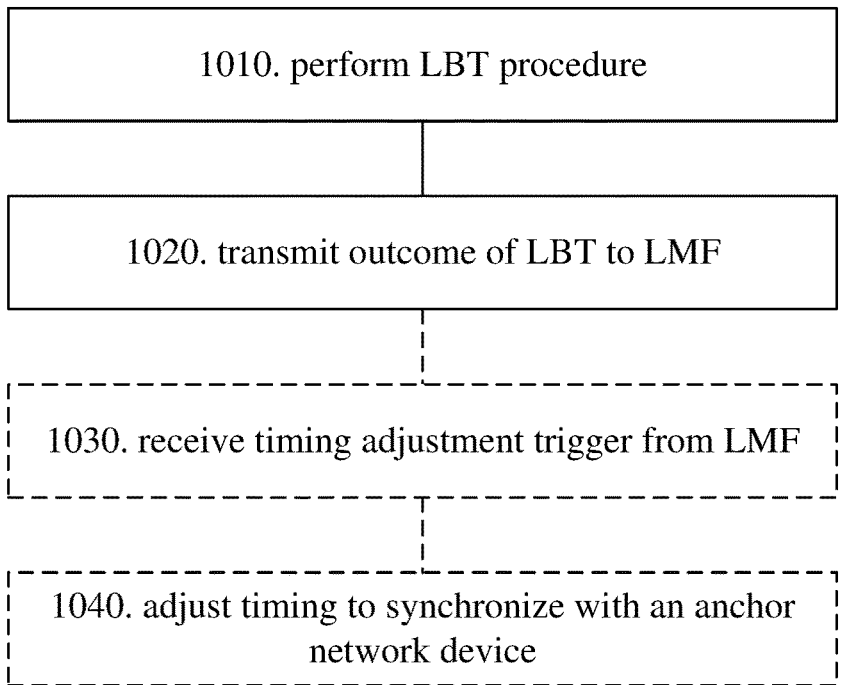
FIG. 10 illustrates a flow chart of an example method for identification and refinement of a time synchronization offset in accordance with some example embodiments.

FIG. 10 illustrates a flow chart of an example method 1000 for identification and refinement of a time synchronization offset in accordance with some example embodiments. For a better understanding, the below description of method 1000 may be read also with reference to FIGS. 3-7.

The method 1000 may be performed for example at network devices such as the anchor BS 410 and/or the normal BSs 420.

As shown in FIG. 10, the example method 1000 may include a step 1010 of performing a LBT procedure before transmitting a RS such as PRS on unlicensed spectrum, and a step 1020 of transmitting an outcome of the LBT procedure to a LMF.

In some embodiments, the method 1000, when implemented at a normal network device such as the normal BS 420, may optionally include a step 1030 of receiving a timing adjustment trigger from the LMF, and a step 1040 of, responsive to the timing adjustment trigger, adjusting the timing of the normal BS to synchronize with an anchor network device such as the anchor BS 410.

The anchor BS 410 and the normal BSs 420 may perform the method 1000 to cooperate with the LMF 430 that performs the method 800. Thus, various features and aspects described above with respect to the example method 800 may also be applied to or included in or combined with the example method 1000.

For example the anchor network device may be the anchor BS 410, the normal network device may be the normal BS 420, and the LMF may be the LMF 430. The steps 1010, 1020, 1030, and 1040 may be performed with reference to the descriptions with respect to the method 800 and therefore repetitive description on the same elements would be omitted.

In some embodiments, the step 1040 may be performed at the normal BS 420 as discussed above with reference to FIG. 6. For example, the step 1040 may further include monitoring a ToA of the PRS from the anchor network device as implemented in Operation 622, determining an expected ToA of the reference signal as implemented in Operation 624, calculating a difference between the expected ToA and the monitored ToA as a synchronization offset between the normal network device and the anchor network device as implemented in Operation 626, and adjusting timing of the normal network device to compensate for the calculated synchronization offset as implemented in Operation 628. The operations 622, 624, 626, and 628 have been described above with reference to FIG. 6 and a repetitive description thereof is omitted here.

In some embodiments, the step 1040 may be performed at the normal BS 420 as discussed above with reference to FIG. 7. For example, the step 1040 may include measuring energy P1 received during CCA in the LBT procedure as implemented in Operation 722, measuring energy P2 of the RS received from the anchor network device during a time period T2 as implemented in Operation 724, calculating a synchronization offset between the normal network device and the anchor network device as (P1/P2)*T2 as implemented in Operation 726, and adjusting timing of the normal network device to compensate for the calculated synchronization offset as implemented in Operation 728. The operations 722, 724, 726, and 728 have been described above with reference to FIG. 7 and a repetitive description thereof is omitted here.

In some embodiments, the step 1040 may include adjusting timing of the normal network device by a predefined increment of time. For example, the normal network device may adjust timing by for example 1 μs as the predefined increment at a time, and repeat the process during the next RS occasion, until no time synchronization offset is identified.

Figure 11:
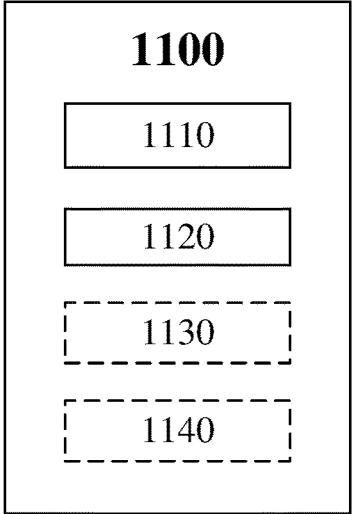
FIG. 11 illustrates a block diagram of an example apparatus in accordance with some example embodiments.

FIG. 11 illustrates a block diagram of an apparatus 1100 in accordance with some example embodiments. The apparatus 1100 may be implemented in for example the anchor BS 410 and/or the normal BSs 420 to perform the method 1000 shown in FIG. 10. Referring to FIG. 11, the apparatus 1100 may include a first means (or module) 1110 for performing the step 1010, and a second means 1120 for performing the step 1020. Optionally, the apparatus 1100 may further include a third means 1130 for performing the step 1030 and a fourth means (or module) 1140 for performing the step 1040.

Figure 12:
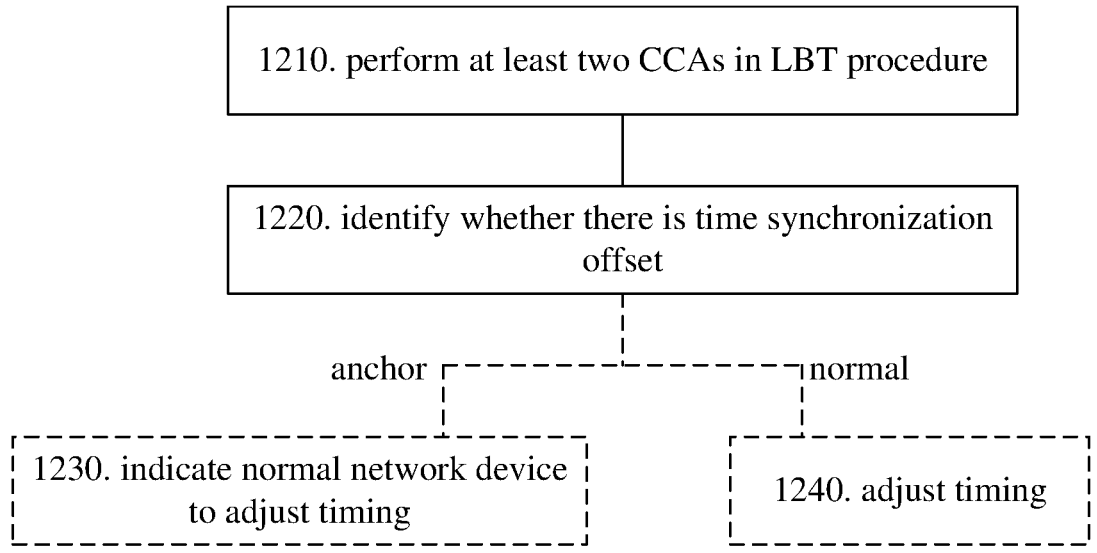
FIG. 12 illustrates a flow chart of an example method for identification and refinement of a time synchronization offset in accordance with some example embodiments.

FIG. 12 illustrates a flow chart of an example method 1200 for identification and refinement of a time synchronization offset in accordance with some example embodiments. For a better understanding, the below description of method 1200 may be read also with reference to FIGS. 3-7. The method 1200 may be performed for example at network devices such as the anchor BS 410 and/or the normal BSs 420.

As shown in FIG. 12, the example method 1200 may include a step 1210 of performing at least two CCAs in a LBT procedure before transmitting a signal on unlicensed spectrum, and a step 1220 of identifying whether there is a time synchronization offset based on the last two CCA outcomes.

In the step 1210, before transmitting a signal on unlicensed spectrum, the plurality of BSs including the anchor BS 410 and the normal BSs 420 may perform LBT including at least two CCA operations. The LBT may be of for example a Cat. 2 type which includes two CCAs or a Cat. 4 type which includes a series of CCAs. In the step 1220, the plurality of BSs may identify whether there is a time synchronization offset based on the last two CCA outcomes.

In some embodiments, in the step 1220, the network device may identify the time synchronization offset if a first one of the last two CCA outcomes is positive while a second one of the last two CCA outcomes is negative. The negative CCA outcome indicates PRS transmission from another network device and thus timing of the present network device is behind the other network device.

In some embodiments, if the method 1200 is performed at a normal network device and the normal network device identifies the time synchronization offset in the step 1220, the method 1200 may optionally include a step 1230 of adjusting timing of the normal network device to synchronize with an anchor network device. In some embodiments, if the method 1200 is performed at an anchor network device and the anchor network device identifies the time synchronization offset in the step 1220, then the method 1200 may optionally include a step 1240 of indicating timing adjustment to a normal network device.

In some embodiments, if the normal BS 420 identifies that its timing is behind the anchor BS 410, then in the step 1240 the normal BS 420 may adjust its timing forward to synchronize with the anchor BS 410. In some embodiments, if the anchor BS 410 identifies that its timing is behind the normal BS 420, it is apparent that the normal BS 420 has positive outcomes from the last two CCAs, and thus in the step 1230 the anchor BS 410 may indicate timing adjustment to the normal BS 420 of which the last two CCAs have positive outcomes. Responsive to the timing adjustment indication from the anchor BS 410, the normal BS 420 having two positive outcomes for the last two CCAs will adjust its timing backward to synchronize with the anchor BS 410. The anchor BS 410 may transmit the timing adjustment indication to the normal BS 420 via Xn interface or may transmit the timing adjustment indication via the LMF 430 to the normal BS 420.

In some embodiments, the step 1240 may be performed at the normal network device as discussed above with reference to FIG. 6. For example, the step 1240 may further include monitoring a ToA of the PRS from the anchor network device as implemented in Operation 622, determining an expected ToA of the reference signal as implemented in Operation 624, calculating a difference between the expected ToA and the monitored ToA as a synchronization offset between the normal network device and the anchor network device as implemented in Operation 626, and adjusting timing of the normal network device to compensate for the calculated synchronization offset as implemented in Operation 628. The operations 622, 624, 626, and 628 have been described above with reference to FIG. 6 and a repetitive description thereof is omitted here.

In some embodiments, the step 1240 may be performed at the normal network device as discussed above with reference to FIG. 7. For example, the step 1040 may include measuring energy P1 received during CCA in the LBT procedure as implemented in Operation 722, measuring energy P2 of the RS received from the anchor network device during a time period T2 as implemented in Operation 724, calculating a synchronization offset between the normal network device and the anchor network device as (P1/P2) *T2 as implemented in Operation 726, and adjusting timing of the normal network device to compensate for the calculated synchronization offset as implemented in Operation 728. The operations 722, 724, 726, and 728 have been described above with reference to FIG. 7 and a repetitive description thereof is omitted here.

In some embodiments, the step 1240 may include adjusting timing of the normal network device by a predefined increment of time. For example, the normal network device may adjust timing by for example 1 μs as the predefined increment at a time, and repeat the process during the next RS occasion, until no time synchronization offset is identified.

Figure 13:
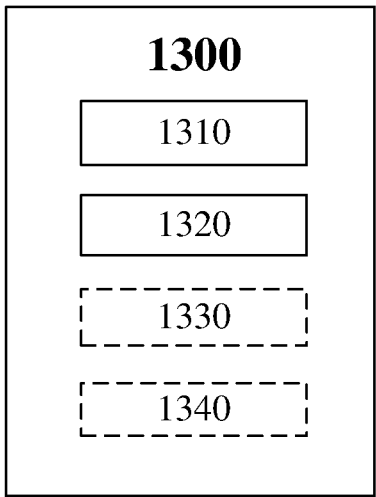
FIG. 13 illustrates a block diagram of an example apparatus in accordance with some example embodiments.

FIG. 13 illustrates a block diagram of an apparatus 1300 in accordance with some example embodiments. The apparatus 1300 may be implemented in for example the anchor BS 410 and/or the normal BSs 420 to perform the method 1200 shown in FIG. 12. Referring to FIG. 13, the apparatus 1300 may include a first means (or module) 1310 for performing the step 1210, and a second means 1320 for performing the step 1220. Optionally, the apparatus 1300 may further include a third means 1330 for performing the step 1230 or a fourth means 1340 for performing the step 1240.

Figure 14:
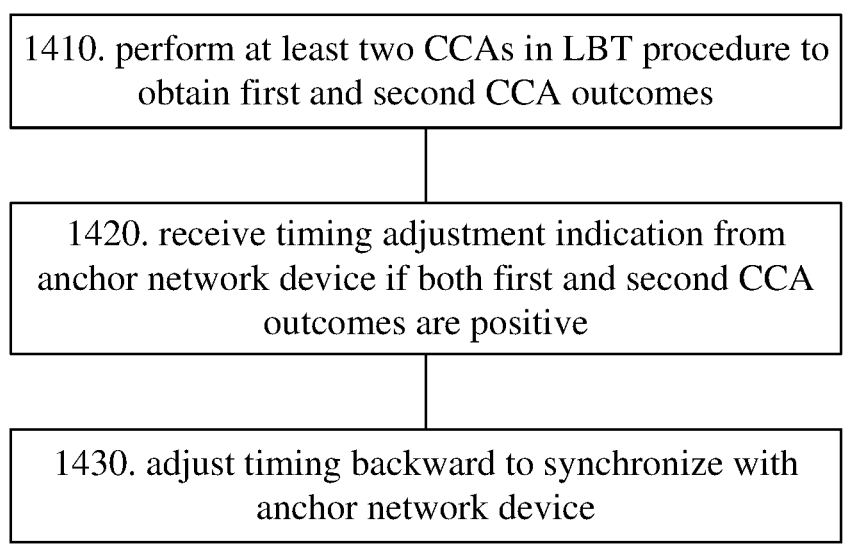
FIG. 14 illustrates a flow chart of an example method for identification and refinement of a time synchronization offset in accordance with some example embodiments.

FIG. 14 illustrates a flow chart of an example method 1400 for identification and refinement of time synchronization offset in accordance with some example embodiments. For a better understanding, the below description of method 1400 may be read also with reference to FIGS. 5-7 and 12. The method 1400 may be performed for example at network devices such as the normal BSs 420.

As shown in FIG. 14, the example method 1400 may include a step 1410 of performing at least two CCAs in a LBT procedure to obtain a first outcome from the second last CCA and a second outcome from the last CCA, before transmitting a signal on unlicensed spectrum, a step 1420 of receiving a timing adjustment indication from an anchor network device in a case where both the first CCA outcome and the second CCA outcome are positive, and a step 1430 of adjusting timing of the network device backward to synchronize with the anchor network device.

The step 1410 may be similar to the step 1210 in FIG. 12, and a detailed description is omitted here. In the step 1420, if both the last two CCAs of the normal BS 420 have a positive outcome and the normal BS 420 receives a timing adjustment indication from the anchor BS 410, it means that timing of the normal BS 420 is ahead of the anchor BS 410 and thus the anchor BS 410 identifies the time synchronization offset. Then in the step 1430, the normal BS 420 may adjust its timing backward to synchronize with the anchor BS 410.

In some embodiments, the step 1430 may be performed at the normal network device such as the normal BS 420 as discussed above with reference to FIG. 6. For example, the step 1430 may include monitoring a ToA of a reference signal (RS) such as a positioning reference signal (PRS) from the anchor network device as implemented in Operation 622, determining an expected ToA of the PRS as implemented in Operation 624, calculating a difference between the expected ToA and the monitored ToA as a time synchronization offset between the network device and the anchor network device as implemented in Operation 626, and adjusting timing of the network device to compensate for the calculated synchronization offset as implemented in Operation 628. The operations 622, 624, 626, and 628 have been described above with reference to FIG. 6 and a repetitive description is omitted here.

In some embodiments, alternatively, the step 1430 may include adjusting the timing of the network device by a predefined increment of time. For example, the normal BS 420 may adjust timing by for example an increment of lus and repeat the process during the next RS occasion, until no time synchronization offset is identified.

Figure 15:
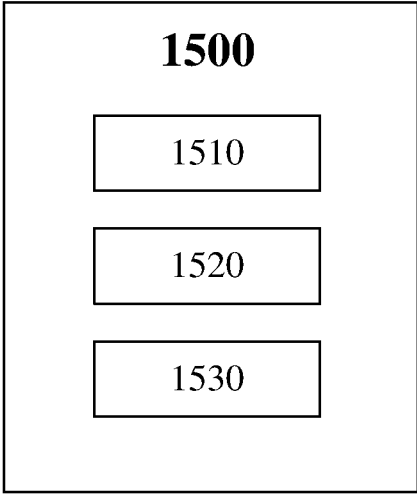
FIG. 15 illustrates a block diagram of an example apparatus in accordance with some example embodiments.

FIG. 15 illustrates a block diagram of an apparatus 1500 in accordance with some example embodiments. The apparatus 1500 may be implemented in for example the normal BSs 420 to perform the method 1400 shown in FIG. 14. Referring to FIG. 15, the apparatus 1500 may include a first means (or module) 1510 for performing the step 1410, a second means 1520 for performing the step 1420, and a third means 1530 for performing the step 1430.

Figure 16:
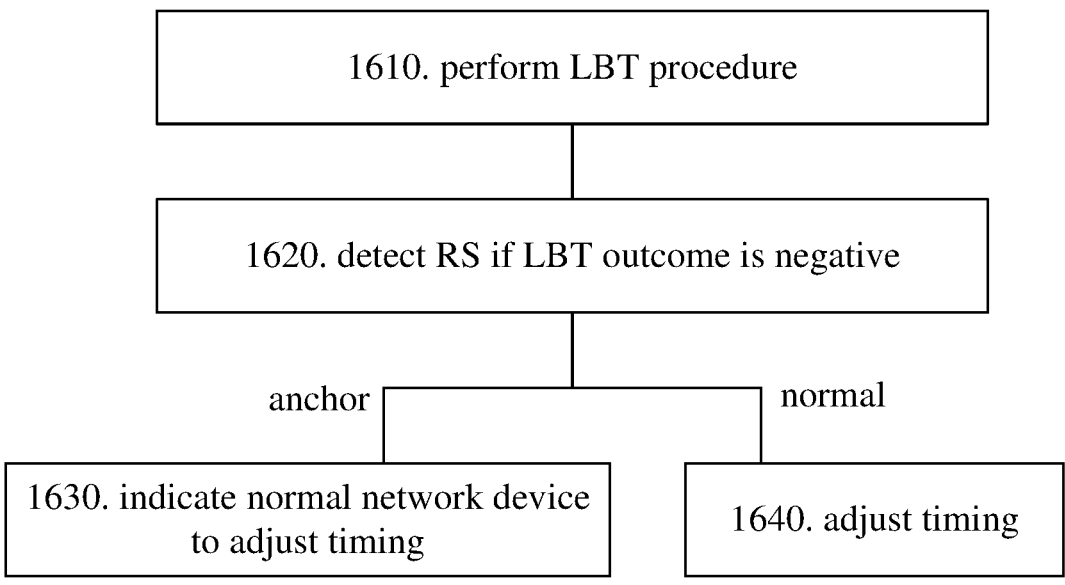
FIG. 16 illustrates a flow chart of an example method for identification and refinement of a time synchronization offset in accordance with some example embodiments.

FIG. 16 illustrates a flow chart of an example method 1600 for identification and refinement of time synchronization offset in accordance with some example embodiments. For a better understanding, the below description of method 1600 may be read also with reference to FIGS. 3-7. The method 1600 may be performed for example at network devices such as the anchor BS 410 and/or the normal BSs 420.

As shown in FIG. 16, the example method 1600 may include a step 1610 of performing a LBT procedure to obtain an LBT outcome before transmitting a signal on unlicensed spectrum and a step 1620 of detecting a RS from an additional network device when the LBT outcome is negative. In a case where the reference signal is detected, the method 1600 may further include a step 1640 of adjusting timing of the network device forward to synchronize with the additional network device when the network device is a normal network device and the additional network device is an anchor network device, or a step 1630 of indicating a backward timing adjustment for the additional network device when the network device is an anchor network device and the additional network device is a normal network device.

In the step 1610 a plurality of BSs may perform LBT procedure and obtain an LBT outcome before transmitting a signal in an unlicensed band. As described with reference to FIG. 3, if the LBT outcome is positive, the BS passes the LBT and it may transmit a RS such as a PRS in the unlicensed band. If the LBT outcome is negative, the BS fails the LBT and it would not transmit the PRS due to the LBT blocking. In the step 1620, the BS having the negative LBT outcome may detect the PRS from an additional network device which has passed the LBT. If the BS successfully detects the PRS from the additional network device, the BS may determine that its timing is behind the additional network device.

Assuming that the network device is the normal BS 420 and the additional network device is the anchor BS 410, in the step 1640, the normal BS 420 may adjust its own timing forward to synchronize with the anchor BS 410.

Assuming that the network device is the anchor BS 410 and the additional network device is the normal BS 420, in the step 1630, the anchor BS 410 may indicate to the normal BS 420 to adjust timing backward to synchronize with the anchor BS 410. The anchor BS 410 may transmit the timing adjustment indication to the normal BS 420 via Xn interface or may transmit the timing adjustment indication via the LMF 430 to the normal BS 420.

In some embodiments, a ToA of the RS may be determined while detecting the RS from the additional network device in the step 1620. The step 1640 may be implemented according to the procedure discussed above with reference to FIG. 6. For example, the step 1640 may include determining an expected ToA of the RS as implemented in Operation 624, calculating a difference between the expected ToA and the determined ToA as a time synchronization offset between the normal network device and the anchor network device as implemented in Operation 626, and adjusting timing of the network device to compensate for the calculated time synchronization offset as implemented in Operation 628. The operations 624, 626, and 628 have been described above with reference to FIG. 6 and a repetitive description thereof is omitted here.

In some embodiments, when performing the LBT procedure in the step 1610, energy P1 received during CCA in the LBT procedure may be determined, as discussed above in Operation 722 in FIG. 7. In the step 1620, when detecting the reference signal from the additional network device, energy P2 of the reference signal received for a time period T2 may be determined, as discussed above in Operation 724 in FIG. 7. The step 1640 may include calculating a time synchronization offset between the normal network device and the anchor network device as (P1/P2)*T2 as implemented in Operation 726, and adjusting timing of the network device to compensate for the calculated time synchronization offset as implemented in Operation 728. The operations 722, 724, 726, and 728 are described above with reference to FIG. 7 and a repetitive description thereof is omitted here.

In some embodiments, alternatively, the timing adjustment procedure in the step 1640 may include a step of adjusting the timing of the network device by a predefined increment of time. For example, the normal BS 420 may adjust its timing by an increment of 1 μs and repeat the process during the next RS occasion, until no time synchronization offset is identified.

Figure 17:
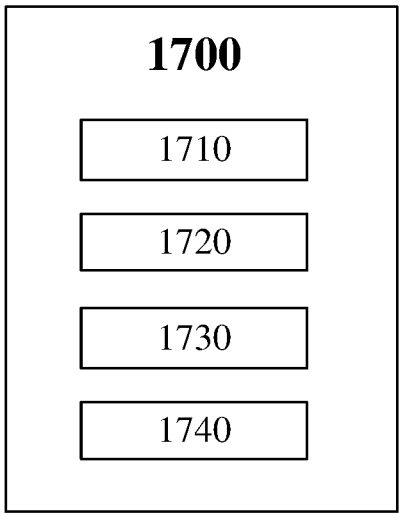
FIG. 17 illustrates a block diagram of an example apparatus in accordance with some example embodiments.

FIG. 17 illustrates a block diagram of an apparatus 1700 in accordance with some example embodiments. The apparatus 1700 may be implemented in for example the anchor BS 410 and/or the normal BSs 420 to perform the method 1600 shown in FIG. 16. Referring to FIG. 17, the apparatus 1700 may include a first means (or module) 1710 for performing the step 1610 and a second means 1720 for performing the step 1620. The apparatus 1700 may further include a third means 1730 for performing the step 1630 or a fourth means 1740 for performing the step 1640.

Figure 18:
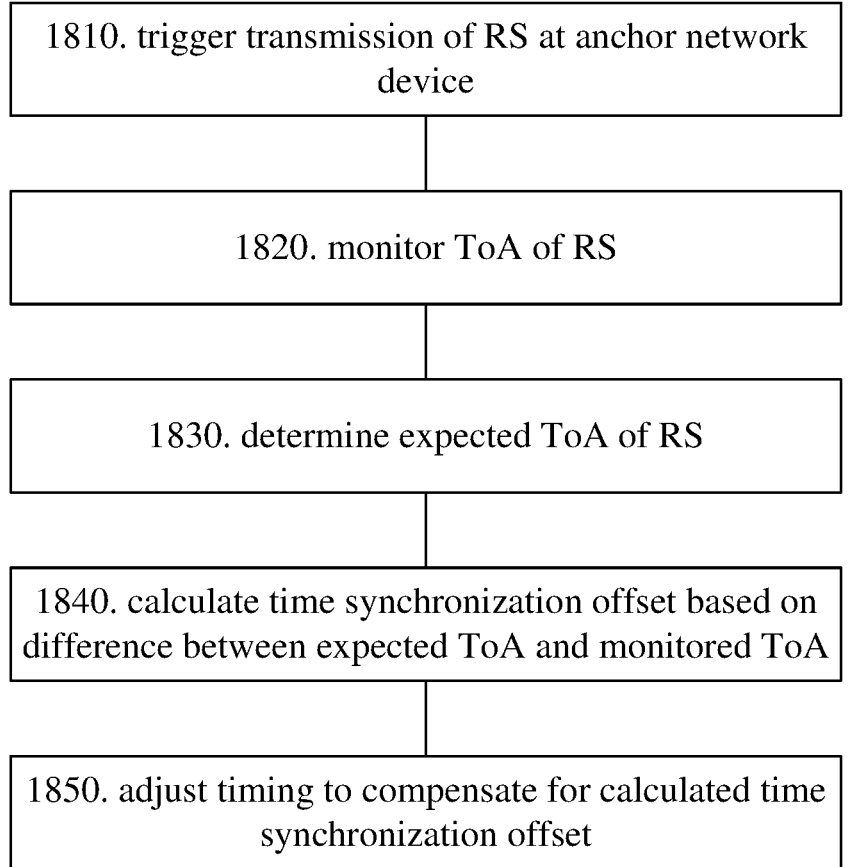
FIG. 18 illustrates a flow chart of an example method for refinement of a time synchronization offset in accordance with some example embodiments.

FIG. 18 illustrates a flow chart of an example method 1800 for time synchronization refinement in accordance with some example embodiments. For a better understanding, the below description of method 1800 may be read also with reference to FIGS. 3-6. The method 1800 may be performed for example at network devices such as the normal BSs 420.

As shown in FIG. 18, the example method 1800 may include a step 1810 of triggering transmission of a RS at an anchor network device, in response to identification of a time synchronization offset for the network device, a step 1820 of monitoring a ToA of the RS from the anchor network device, a step 1830 of determining an expected ToA of the RS, a step 1840 of calculating a difference between the expected ToA and the monitored ToA as the time synchronization offset between the network device and the anchor network device, and a step 1850 of adjusting timing of the network device to compensate for the calculated time synchronization offset.

In the step 1810, the normal BS 420 may identify the time synchronization offset in any suitable manner, including but not limited to those discussed above. For example, the normal BS 420 may identify the time synchronization offset by itself based on the LBT CCAs, or by receiving an indication from other network devices such as the anchor BS 410 and the LMF 430. Then, the normal BS 420 may perform steps 1820, 1830, 1840, and 1850 to refine the time synchronization offset. The step 1820 may be implemented according to Operation 622 in FIG. 6, the step 1830 may be implemented according to Operation 624, the step 1840 may be implemented according to Operation 626, and the step 1850 may be implemented according to Operation 628. The operations 622, 624, 626, and 628 have been described above with reference to FIG. 6 and a repetitive description thereof is omitted here.

Figures 19, 20:
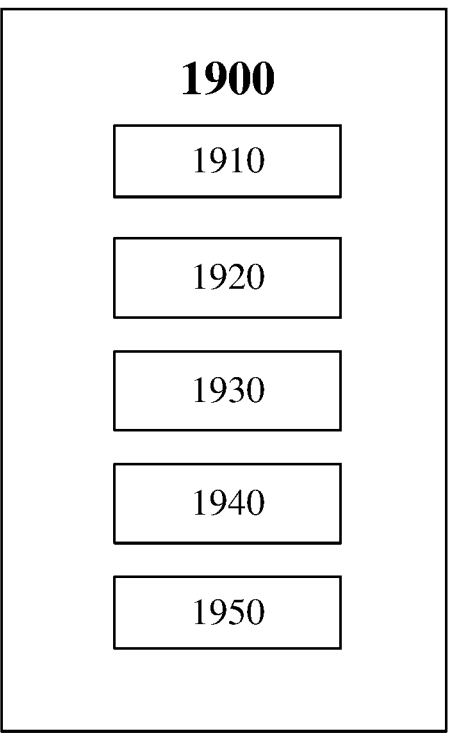
FIG. 19 illustrates a block diagram of an example apparatus in accordance with some example embodiments.
FIG. 20 illustrates a flow chart of an example method for interference check in accordance with some example embodiments.

FIG. 19 illustrates a block diagram of an apparatus 1900 in accordance with some example embodiments. The apparatus 1900 may be implemented in for example the normal BSs 420 to perform the method 1800 shown in FIG. 18. Referring to FIG. 19, the apparatus 1900 may include a first means (or module) 1910 for performing the step 1810, a second means 1920 for performing the step 1820, a third means 1930 for performing the step 1830, a fourth means 1940 for performing the step 1840, and a fifth means 1950 for performing the step 1850.

FIG. 20 illustrates a flow chart of an example method 2000 of checking interference in accordance with some example embodiments. The method 2000 may be performed for example at terminal devices such as the UE 440.

As shown in FIG. 20, the example method 2000 may include a step 2010 of measuring a quality associated with a RS transmitted from a first network device on an unlicensed spectrum, and a step 2020 of reporting the quality to a second network device. The quality may be indicative of a degree of interference in the unlicensed spectrum.

The UE 440 may be configured to measure quality associated with a RS on an unlicensed spectrum from a first network device and report the quality to a second network device.

The quality may be for example SINR of the RS such as the PRS received at the UE 440. The RS is transmitted on an unlicensed spectrum, so if there is a relatively high degree of interference such as WiFi and/or other signals present during the RS transmission window, the measured quality of the RS may be poor at the UE 440 (e.g., the SINR is lower than a predefined threshold and/or the like). And if there is no or limited interference present during the RS transmission window, the quality of RS measurement may be good at the UE 440 (e.g., the SINR is greater than or otherwise satisfying a predefined threshold). The quality may therefore indicate the degree of interference in the unlicensed spectrum. The UE 440 may report the quality to a second network device regardless of the detection of the RS. For example, the UE 440 may consider the quality of the PRS is very low when no PRS is detected.

In some embodiments, the first network device may be a BS, and the second network device may be an LMF or the BS. According to the measured quality received from the first network device, the second network device may know a level of interference in the unlicensed spectrum so that it can determine if LBT blocking is caused by a time synchronization offset or by the interference.

Figure 21:
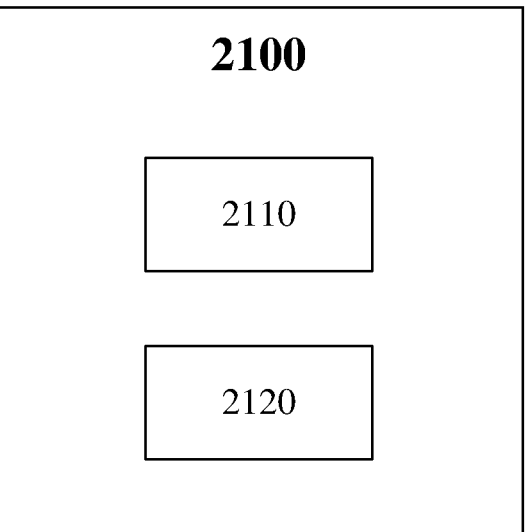
FIG. 21 illustrates a block diagram of an example apparatus in accordance with some example embodiments.

FIG. 21 illustrates a block diagram of an apparatus 2100 in accordance with some example embodiments. The apparatus 2100 may be implemented in for example the UE 440 to perform the method 2000 shown in FIG. 20. Referring to FIG. 21, the apparatus 2100 may include a first means (or module) 2110 for performing the step 2010, and a second means 2120 for performing the step 2020.

In the above described embodiments, synchronization issue of the BSs may be identified and refined so that LBT blocking due to a synchronization offset may be reduced. Although the embodiments are described with reference to UE positioning and the positioning reference signal, it would be appreciated that the embodiments are also applicable for other services and/or signals used in the unlicensed spectrum.

Figure 22:
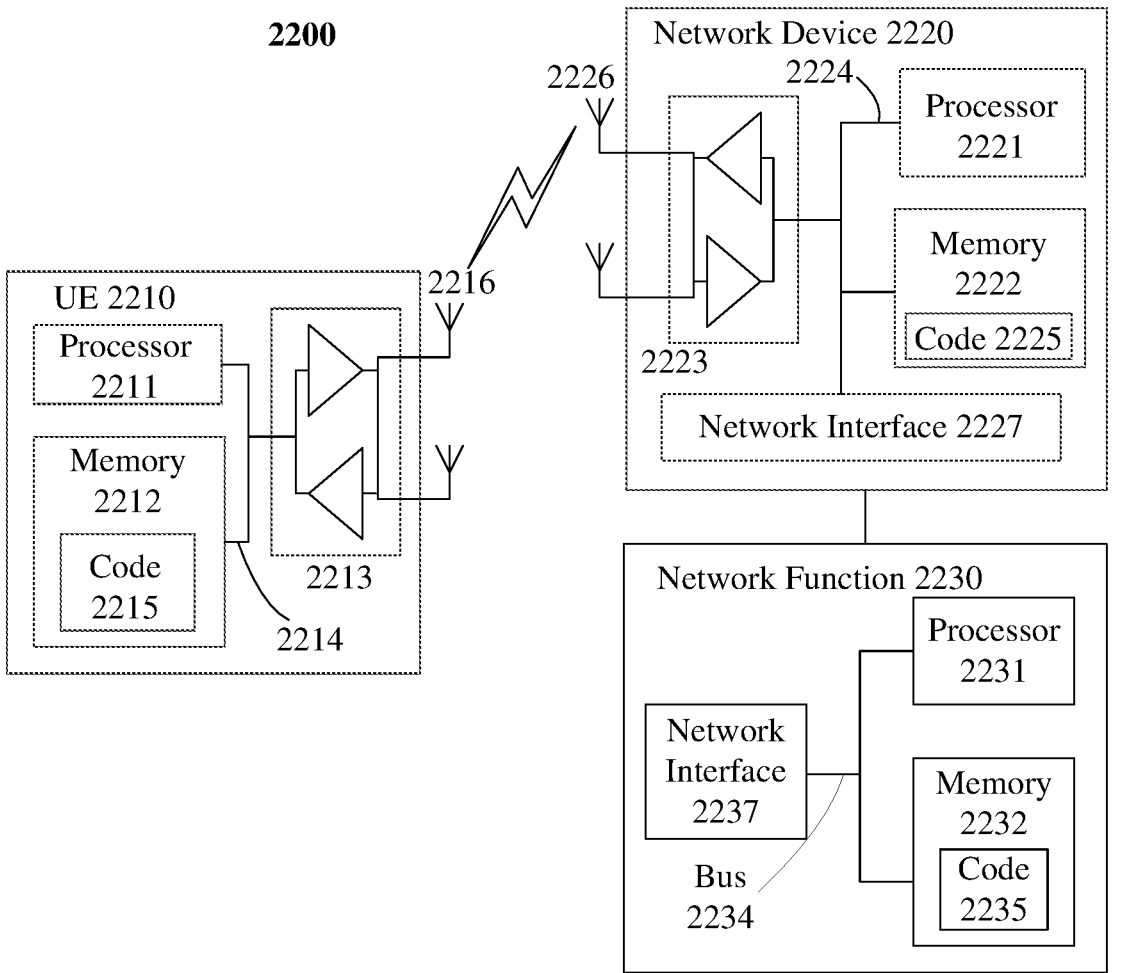
FIG. 22 illustrates a block diagram of an example communication system in which the example embodiments may be practiced.

FIG. 22 illustrates a block diagram of an example communication system 2200 in which embodiments of the present disclosure can be implemented. As shown in FIG. 22, the communication system 2200 may comprise user equipment (UE) 2210 which may be implemented as the UE 440 discussed above, a network device 2220 which may be implemented as the anchor BS 410 or normal BS 420 discussed above, and a network function 2230 which may be implemented as the LMF 430 discussed above. Although FIG. 22 shows only one network device 2220, it would be appreciated that the communication system 2200 may comprise a plurality of network devices 2220 which assist positioning of the UE 2210.

Referring to FIG. 22, the UE 2210 may comprise one or more processors 2211, one or more memories 2212 and one or more transceivers 2213 interconnected through one or more buses 2214. The one or more buses 2214 may be address, data, or control buses, and may include any interconnection mechanism such as series of lines on a motherboard or integrated circuit, fiber, optics or other optical communication equipment, and the like. Each of the one or more transceivers 2213 may comprise a receiver and a transmitter, which are connected to one or more antennas 2216. The UE 2210 may wirelessly communicate with the network device 2220 through the one or more antennas 2216. The one or more memories 2212 may include computer program code 2215. The one or more memories 2212 and the computer program code 2215 may be configured to, when executed by the one or more processors 2211, cause the UE 2210 to perform processes and steps relating to the UE 440 as described above.

The network device 2220 may comprise one or more processors 2221, one or more memories 2222, one or more transceivers 2223 and one or more network interfaces 2227 interconnected through one or more buses 2224. The one or more buses 2224 may be address, data, or control buses, and may include any interconnection mechanism such as a series of lines on a motherboard or integrated circuit, fiber, optics or other optical communication equipment, and the like. Each of the one or more transceivers 2223 may comprise a receiver and a transmitter, which are connected to one or more antennas 2226. The network device 2220 may operate as a BS for the UE 2210 and wirelessly communicate with the UE 2210 through the one or more antennas 2226. The one or more network interfaces 2227 may provide wired or wireless communication links through which the network device 2220 may communicate with other network devices, entities, elements or functions. The one or more memories 2222 may include computer program code 2225. The one or more memories 2222 and the computer program code 2225 may be configured to, when executed by the one or more processors 2221, cause the network device 2220 to perform processes and steps relating to the anchor BS 410 or normal BS 420 as described above.

The network function 2230 may comprise one or more processors 2231, one or more memories 2232, and one or more network interfaces 2237 interconnected through one or more buses 2234. The one or more buses 2234 may be address, data, or control buses, and may include any interconnection mechanism such as a series of lines on a motherboard or integrated circuit, fiber, optics or other optical communication equipment, and the like. The network function 2230 may operate as a core network function and wired or wirelessly communicate with the BS 2220 through one or more links. The one or more network interfaces 2237 may provide wired or wireless communication links through which the network function 2230 may communicate with other network devices, entities, elements or functions. The one or more memories 2232 may include computer program code 2235. The one or more memories 2232 and the computer program code 2235 may be configured to, when executed by the one or more processors 2231, cause the network device 2230 to perform processes and steps relating to the LMF 430 as described above.

The one or more processors 2211, 2221 and 2231 discussed above may be of any appropriate type that is suitable for the local technical network, and may include one or more of general purpose processors, special purpose processor, microprocessors, a digital signal processor (DSP), one or more processors in a processor based multi-core processor architecture, as well as dedicated processors such as those developed based on Field Programmable Gate Array (FPGA) and Application Specific Integrated Circuit (ASIC). The one or more processors 2211, 2221 and 2231 may be configured to control other elements of the UE/network device/network element and operate in cooperation with them to implement the procedures discussed above.

The one or more memories 2212, 2222 and 2232 may include at least one storage medium in various forms, such as a volatile memory and/or a non-volatile memory. The volatile memory may include but not limited to for example a random access memory (RAM) or a cache. The non-volatile memory may include but not limited to for example a read only memory (ROM), a hard disk, a flash memory, and the like. Further, the one or more memories 2212, 2222 and 2232 may include but not limited to an electric, a magnetic, an optical, an electromagnetic, an infrared, or a semiconductor system, apparatus, or device or any combination of the above.

It would be understood that blocks in the drawings may be implemented in various manners, including software, hardware, firmware, or any combination thereof. In some embodiments, one or more blocks may be implemented using software and/or firmware, for example, machine-executable instructions stored in the storage medium. In addition to or instead of machine-executable instructions, parts or all of the blocks in the drawings may be implemented, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-Chip systems (SOCs), Complex Programmable Logic Devices (CPLDs), etc.

Some exemplary embodiments further provide computer program code or instructions which, when executed by one or more processors, may cause a device or apparatus to perform the procedures described above. The computer program code for carrying out procedures of the exemplary embodiments may be written in any combination of one or more programming languages. The computer program code may be provided to one or more processors or controllers of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

Some exemplary embodiments further provide a computer program product or a computer readable medium having the computer program code or instructions stored therein. The computer readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

What is claimed is:

1. A network device comprising:
at least one processor; and
at least one memory including computer program code, the at least one memory and the computer program code are configured to, with the at least one processor, cause the network device to:
before transmitting a reference signal on an unlicensed spectrum, perform the following operations:
perform two Cat. 2 clear channel assessments (CCAs) as part of a listen-before-talk (LBT) procedure during a scheduled positioning reference signal (PRS) transmission occasion, the two CCA operations comprising:
a second to last CCA, and
a last CCA performed immediately prior to a PRS transmission window configured according to a comb-6 configuration; and
based on the performing, obtain a first outcome from the second to last CCA and a second outcome from the last CCA;
determine that both the second to last CCA and the last CCA yield a positive LBT outcome, the positive LBT outcome indicating that no signal energy exceeding a predefined threshold was detected in the unlicensed spectrum during a duration of either the second to last CCA and the last CCA;
receive, by a signaling message from an anchor network device over an Xn interface, a timing adjustment indication specifying a backward timing adjustment based on the anchor network device having identified, during the PRS transmission occasion, a failed LBT outcome due to detection of PRS energy from the network device during a CCA sensing interval for the network device;
verify an absence of interference by verifying that no PRS quality measurement report received by a location management function (LMF) from a user equipment indicates signal-to-interference-plus-noise ratio (SINR) below a predefined threshold for the PRS transmission occasion; and
in response to the timing adjustment indication and the verified absence of interference, adjust a timing of the network device backward to a predefined time increment of one microsecond to reduce a time synchronization offset relative to the anchor network device, wherein the adjusting of the timing of the network device is performed by:
triggering a transmission of the reference signal at the anchor network device;
monitoring a time of arrival (ToA) of the reference signal from the anchor network device;
determining an expected ToA of the reference signal;
calculating a difference between the expected ToA and the monitored ToA as the time synchronization offset; and

adjusting the timing of the network device to compensate for the calculated time synchronization offset.

2. The network device of claim 1, wherein the reference signal is a PRS, and the reference signal is transmitted periodically from the anchor network device or triggered by the network device.

3. A method comprising:
before transmitting a reference signal on an unlicensed spectrum, perform the following operations:
performing, by a network device, two Cat. 2 clear channel assessments (CCAs) as part of a listen-before-talk (LBT) procedure during a scheduled positioning reference signal (PRS) transmission occasion, the two CCA operations comprising:
a second to last CCA, and
a last CCA performed immediately prior to a PRS transmission window configured according to a comb-6 configuration; and
based on the performing, obtain a first outcome from the second to last CCA and a second outcome from the last CCA;
determining, by the network device, that both the second to last CCA and the last CCA yield a positive LBT outcome, the positive LBT outcome indicating that no signal energy exceeding a predefined threshold was detected in the unlicensed spectrum during a duration of either the second to last CCA and the last CCA;
receive, by the network device, a signaling message from an anchor network device over an Xn interface, the signaling message comprising a timing adjustment indication specifying a backward timing adjustment based on the anchor network device having identified, during the PRS transmission occasion, a failed LBT outcome due to detection of PRS energy from the network device during a CCA sensing interval for the network device;
verify, by the network device, an absence of interference by verifying that no PRS quality measurement report received by a location management function (LMF) from a user equipment indicates signal-to-interference-plus-noise ratio (SINR) below a predefined threshold for the PRS transmission occasion; and
in response to the timing adjustment indication and the verified absence of interference, adjust, by the network device, a timing of the network device backward to a predefined time increment of one microsecond to reduce a time synchronization offset relative to the anchor network device, wherein the adjusting of the timing of the network device is performed by:
triggering a transmission of the reference signal at the anchor network device;
monitoring a time of arrival (ToA) of the reference signal from the anchor network device;
determining an expected ToA of the reference signal;
calculating a difference between the expected ToA and the monitored ToA as the time synchronization offset; and
adjusting the timing of the network device to compensate for the calculated time synchronization offset.

* * * * *